(12) United States Patent
Jain et al.

(10) Patent No.: US 11,580,013 B2
(45) Date of Patent: Feb. 14, 2023

(54) FREE SPACE MANAGEMENT IN A BLOCK STORE

(71) Applicant: NUTANIX, INC., San Jose, CA (US)

(72) Inventors: Rohit Jain, Cupertino, CA (US); Pradeep Kashyap Ramaswamy, San Jose, CA (US)

(73) Assignee: NUTANIX, INC., San Jose, CA (US)

(*) Notice: Subject to any disclaimer, the term of this patent is extended or adjusted under 35 U.S.C. 154(b) by 95 days.

(21) Appl. No.: 17/161,518

(22) Filed: Jan. 28, 2021

(65) Prior Publication Data
US 2022/0138095 A1  May 5, 2022

Related U.S. Application Data

(60) Provisional application No. 63/108,136, filed on Oct. 30, 2020.

(51) Int. Cl.
| | |
|---|---|
| *G06F 12/02* | (2006.01) |
| *G06F 16/901* | (2019.01) |
| *G06F 16/22* | (2019.01) |
| *G06F 3/06* | (2006.01) |

(52) U.S. Cl.
CPC .......... *G06F 12/023* (2013.01); *G06F 3/0604* (2013.01); *G06F 3/064* (2013.01); *G06F 3/067* (2013.01); *G06F 3/0673* (2013.01); *G06F 16/2246* (2019.01); *G06F 16/9027* (2019.01); *G06F 2212/1044* (2013.01)

(58) Field of Classification Search
CPC ...... G06F 3/0604; G06F 3/064; G06F 3/0673; G06F 16/2246; G06F 16/9027; G06F 2212/1044; G06F 16/1727; G06F 12/02–0276

USPC .................................. 711/171; 707/813–820
See application file for complete search history.

(56) References Cited

U.S. PATENT DOCUMENTS

| | | |
|---|---|---|
| 5,247,634 A | 9/1993 | Cline et al. |
| 5,561,786 A | 10/1996 | Morse |
| 7,380,091 B2 | 5/2008 | Bayt |
| 8,312,242 B2 | 11/2012 | Casper et al. |
| 8,549,518 B1 | 10/2013 | Aron et al. |
| 8,601,473 B1 | 12/2013 | Aron et al. |
| 8,850,130 B1 | 9/2014 | Aron et al. |
| 8,863,124 B1 | 10/2014 | Aron |
| 9,009,106 B1 | 4/2015 | Aron et al. |
| 9,069,708 B2 | 6/2015 | Gill et al. |
| 9,336,132 B1 | 5/2016 | Aron et al. |

(Continued)

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown); pp. all.

(Continued)

*Primary Examiner* — Reginald G Bragdon
*Assistant Examiner* — Aaron D Ho
(74) *Attorney, Agent, or Firm* — Artegis Law Group, LLP

(57) ABSTRACT

Various embodiments set forth techniques for free space management in a block store. The techniques include receiving a request to allocate one or more blocks in a block store, accessing a sparse hierarchical data structure to identify an allocator page identifying a region of a backing store having a greatest number of free blocks, and allocating the one or more blocks.

27 Claims, 16 Drawing Sheets

(56) References Cited

U.S. PATENT DOCUMENTS

| | | | |
|---|---|---|---|
| 9,652,265 | B1 | 5/2017 | Narayanasamy et al. |
| 9,747,287 | B1 | 8/2017 | Bhardwaj et al. |
| 9,772,866 | B1 | 9/2017 | Aron et al. |
| 2009/0144310 | A1* | 6/2009 | Ruml ................. G06F 16/9027 707/E17.05 |
| 2011/0131387 | A1 | 6/2011 | Bacik |
| 2016/0110120 | A1* | 4/2016 | Pattabiraman ........ G06F 3/0616 711/156 |
| 2016/0321366 | A1* | 11/2016 | Sankar ................ G06F 16/3341 |
| 2017/0344300 | A1* | 11/2017 | Chang ................ G06F 12/1009 |
| 2019/0043540 | A1* | 2/2019 | Chagam Reddy .... G06F 3/0616 |
| 2020/0097288 | A1* | 3/2020 | Schlegel .............. G06F 12/023 |
| 2020/0348933 | A1* | 11/2020 | Schlegel ............. G06F 16/9027 |
| 2021/0064626 | A1* | 3/2021 | Shrum .................. G06F 16/906 |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown); pp. all.

Poitras, Steven. "The Nutanix Bible" (Jun. 20, 2014), from http://stevenpoitras.com/the-nutanix-bible/ (Publication date based on indicated capture date by Archive.org; first publication date unknown); pp. all.

Poitras, Steven. "The Nutanix Bible" (Jan. 7, 2015), from http://stevenpoitras.com/the-nutanix-bible/ (Publication date based on indicated capture date by Archive.org; first publication date unknown); pp. all.

Poitras, Steven. "The Nutanix Bible" (Jun. 9, 2015), from http://stevenpoitras.com/the-nutanix-bible/ (Publication date based on indicated capture date by Archive.org; first publication date unknown); pp. all.

Poitras, Steven. "The Nutanix Bible" (Sep. 4, 2015), from https://nutanixbible.com/; pp. all.

Poitras, Steven. "The Nutanix Bible" (Jan. 12, 2016), from https://nutanixbible.com/; pp. all.

Poitras, Steven. "The Nutanix Bible" (Jun. 9, 2016), from https://nutanixbible.com/; pp. all.

Poitras, Steven. "The Nutanix Bible" (Jan. 3, 2017), from https://nutanixbible.com/; pp. all.

Poitras, Steven. "The Nutanix Bible" (Jun. 8, 2017), from https://nutanixbible.com/; pp. all.

Poitras, Steven. "The Nutanix Bible" (Jan. 3, 2018), from https://nutanixbible.com/; pp. all.

Poitras, Steven. "The Nutanix Bible" (Jun. 25, 2018), from https://nutanixbible.com/; pp. all.

Poitras, Steven. "The Nutanix Bible" (Jan. 8, 2019), from https://nutanixbible.com/; pp. all.

Poitras, Steven. "The Nutanix Bible" (Jul. 25, 2019), from https://nutanixbible.com/; pp. all.

Poitras, Steven. "The Nutanix Bible" (Sep. 17, 2019), from https://nutanixbible.com/; pp. all.

Cano, Ignacio et al. "Curator: Self-Managing Storage for Enterprise Clusters"; University of Washington; published Mar. 2017; pp. all.

Poitras, Steven. "The Nutanix Bible" (Mar. 2, 2020), from https://nutanixbible.com/; pp. all.

Poitras, Steven. "The Nutanix Bible" (Sep. 1, 2020), from https://nutanixbible.com/; pp. all.

"Accelerate Your NVMe Drives with SPDK", Published Sep. 30, 2016, https://software.intel.com/content/www/us/en/develop/articles/accelerating-your-nvme-drives-with-spdk.html, 13 pages.

"Automatic Segment Space Management" https://oracle-base.com/articles/9i/automatic-segment-free-space-management, 1 page.

Brodal et al, "Fast Allocation and Deallocation with an Improved Buddy System", https://users-cs.au.dk/gerth/papers/alcomft-tr-03-3.pdf, 15 pages.

"Free-Space Management", http://pages.cs.wisc.edu/~remzi/OSTEP/vm-freespace.pdf, 18 pages.

"Automatic Segment Space Management" https://oracle-base.com/articles/9i/automatic-segment-free-spacemanagement, 1 page, Jun. 27, 2015.

Brodal et al, "Fast Allocation and Deallocation with an Improved Buddy System", https://users-cs.au.dk/gerth/papers/alcomft-tr-03-3.pdf, 15 pages, May 4, 2003.

"Free-Space Management", http://pages.cs.wisc.edu/~remzi/OSTEP/vm-freespace.pdf, 18 pages, Jul. 15, 2022.

"Zoned Storage Overview", https://zonedstorage.io/introduction/zoned-storage/, 6 pages, Feb. 17, 2021.

* cited by examiner

FREE SPACE MANAGEMENT IN A BLOCK STORE

CROSS-REFERENCE TO RELATED APPLICATIONS

This application claims priority benefit of the United States Provisional Patent Application titled, "FREE SPACE MANAGEMENT IN A BLOCK STORE," filed on Oct. 30, 2020 and having Ser. No. 63/108,136. The subject matter of this related application is hereby incorporated herein by reference.

TECHNICAL FIELD

The contemplated embodiments relate generally to management of storage in a computing system and, more specifically, to free space management in a block store.

BACKGROUND

The amount of data being stored, managed, and accessed by computing systems is constantly increasing. To keep up with the increasing amounts of data, computing systems, such as those using the ext4 file system, are being tasked with the management of storage systems and backing stores of increasing capacity. With each increase in capacity, the amount of metadata used to help manage these backing stores increases as well. For example, when a 1 petabyte (PB or $2^{50}$ bytes) backing store is organized using 8 kB ($2^{13}$ bytes) blocks to form a block store, the block store includes over 137 billion ($2^{50}/2^{13}=2^{37}$) blocks, which have to be tracked and managed. Even using an efficient allocator data structure that can track whether each block in the block store is free (e.g., allocated or not allocated) using a single bit, a 4 kB allocator page is only able to track 32,768 ($2^{15}$) blocks, which corresponds to 256 MB of storage in the block store. To manage the entire 1 PB block store, the allocator data structure has to manage over 4 million allocator pages (16 GB of storage). A data structure of this size is typically too large to keep entirely in main memory.

One way to reduce the amount of main memory used for the allocator is to move some or all of the allocator data structure to the backing store. However, simply moving the allocator data structure to the backing store is likely to result in significant overhead when accessing the allocator data structure. For example, each backing store access has a latency that is several orders of magnitude larger than the latency to access main memory. Thus, the delays to access the allocator data structure when allocating or deallocating blocks in the block store may become excessive.

Accordingly, there is need for improved techniques for free space management in block stores.

SUMMARY

Various embodiments of the present disclosure set forth a method for free space management in a block store. The method includes receiving a request to allocate one or more blocks in a block store, accessing a sparse hierarchical data structure to identify an allocator page identifying a region of a backing store having a greatest number of free blocks, and allocating the one or more blocks.

Other embodiments include, without limitation, a system that implements one or more aspects of the disclosed techniques, and one or more computer readable media including instructions for performing one or more aspects of the disclosed techniques.

At least one technical advantage of the disclosed techniques relative to the prior art is that the disclosed techniques enable an allocator to identify an allocator page associated with the largest number of free blocks with greater efficiency and speed relative to prior techniques. Another advantage of the disclosed techniques is that, because the allocator only initiates leaf nodes and parent nodes if and when needed, the allocator initializes, searches, and updates the allocator data structure with improved speed and storage efficiency relative to conventional approaches. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

Block Stores

Figure 1:
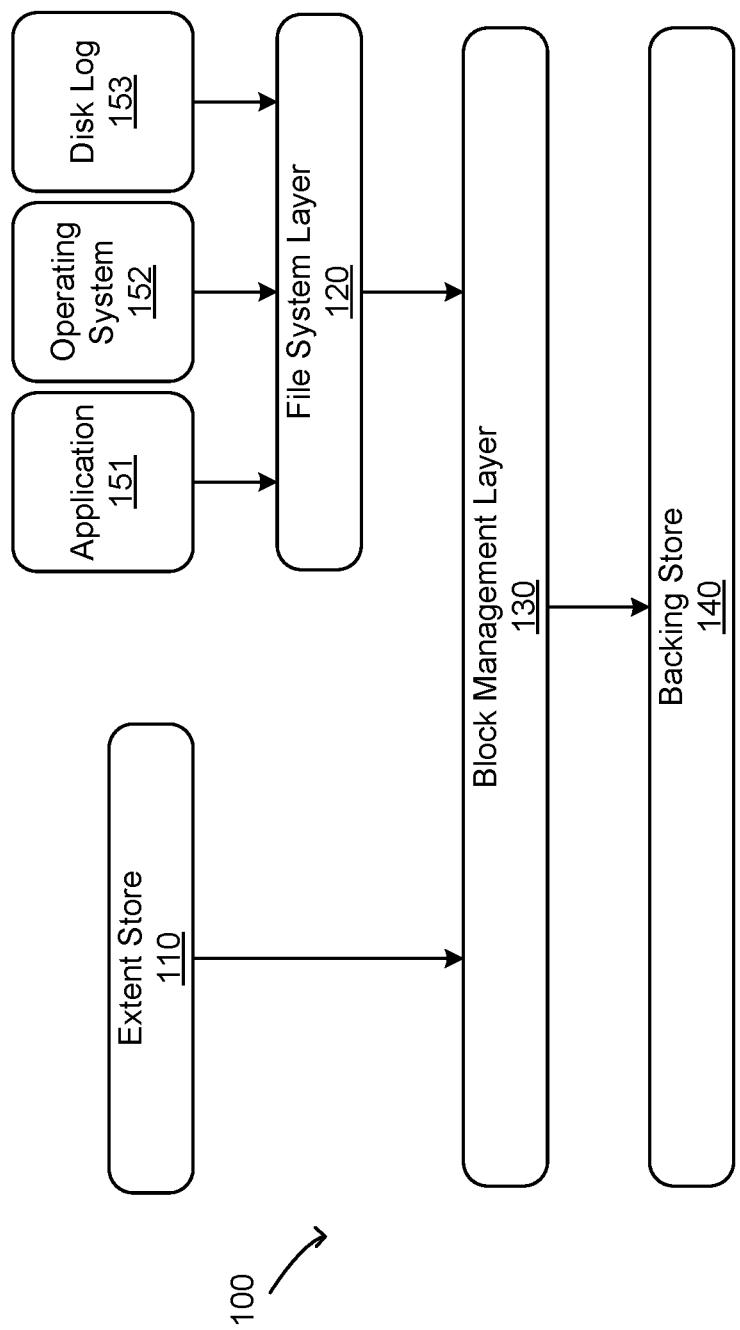
FIG. 1 is a block diagram illustrating a block store according to various embodiments of the present disclosure.

FIG. 1 is a block diagram illustrating a block store 100 according to various embodiments of the present disclosure. As shown in FIG. 1, block store 100 is built around a backing store 140. Backing store 140 is a linearly addressable storage entity. In some embodiments, backing store can be a physical storage device such as a hard disk drive (HDD), a solid-state drive (SSD), a non-volatile memory express (NVMe) device, Optane memory, and/or the like, a virtual storage device such as a vDisk or a non-persistent linearly addressable device such as DRAM. Block store 100 provides several services for accessing backing store 140.

A block management layer 130 is responsible for allocation and deallocation of blocks of storage in backing store 140. Block management layer 130 provides a block allocation application programming interface (API) that may be used by other parts of block store 100. In some embodiments, the minimum block size that block store 100 supports is provided as an argument to a block store format operation. Allocations and deallocations of blocks in block store 100 are performed using an entity called a component. In some embodiments, an application, such as any of application 151, operating system 152, disk log 153, and/or the like, may register multiple components in a single block store instance. When registering a component, the application may provide a block size that is a multiple of the minimum block size provided during block store format. In this manner, every component may have a unique block size.

In some embodiments, each component object provides a block allocation/deallocation API. In some embodiments, each component allocates from a separate region in backing store 140 at any given time, thereby minimizing allocation interference between various components. For example, random allocations and deallocations by an extent store component 110 do not generally impact sequential allocations by a file system component used by one of the applications 151-153.

In some embodiments, block store 100 performs no hard partitioning of space among components, and each component may dynamically allocate and deallocate free regions of backing store 140. Regions are described in further detail below with respect to FIG. 2.

A file system layer 120 couples block management layer 130 to applications 151-153. In some embodiments, file system layer 120 is compatible with the fourth extended file system (ext4) employed by certain systems that execute the Linux operating system. File system layer 120 provides a file system API usable by applications 151-153. In some embodiments, file system layer 120 provides a POSIX-like file system API to applications 151-153. File system layer 120 is employed by those portions of applications 151-153 that do not manage metadata for block store 100 at a block level, but rather at a file level. For example, the file-system backend used by disk log 153 employs the file system API to generate difference files, also referred to herein as "delta files," and checkpoint files. As other examples, additional applications (not shown) use the file system API to manage episode files, database files, and/or the like.

In some embodiments, file system layer 120 employs B+Trees to store the blocks backing the files. For example, a file descriptor for a file is the inode identifier (ID) which, in turn, is a pointer to the root block of the B+Tree containing the blocks backing the file. The key in the file descriptor is the logical block address (LBA) and the value is an extent-like structure which provides the starting block ID and the number of blocks backing the space starting at a given LBA. Minimal metadata about the file (such as the size and the m-time) is stored as a special key-value pair in the B+Tree.

In some embodiments, file system layer 120 implements directories using B+Trees to store mappings from file names to the corresponding inode IDs and inode types. The inode ID for a file points to the root node of the B+Tree for that file, and the inode ID for a directory points to the root node of the B+Tree for that directory.

Free Space Management in a Block Store

Figure 2:
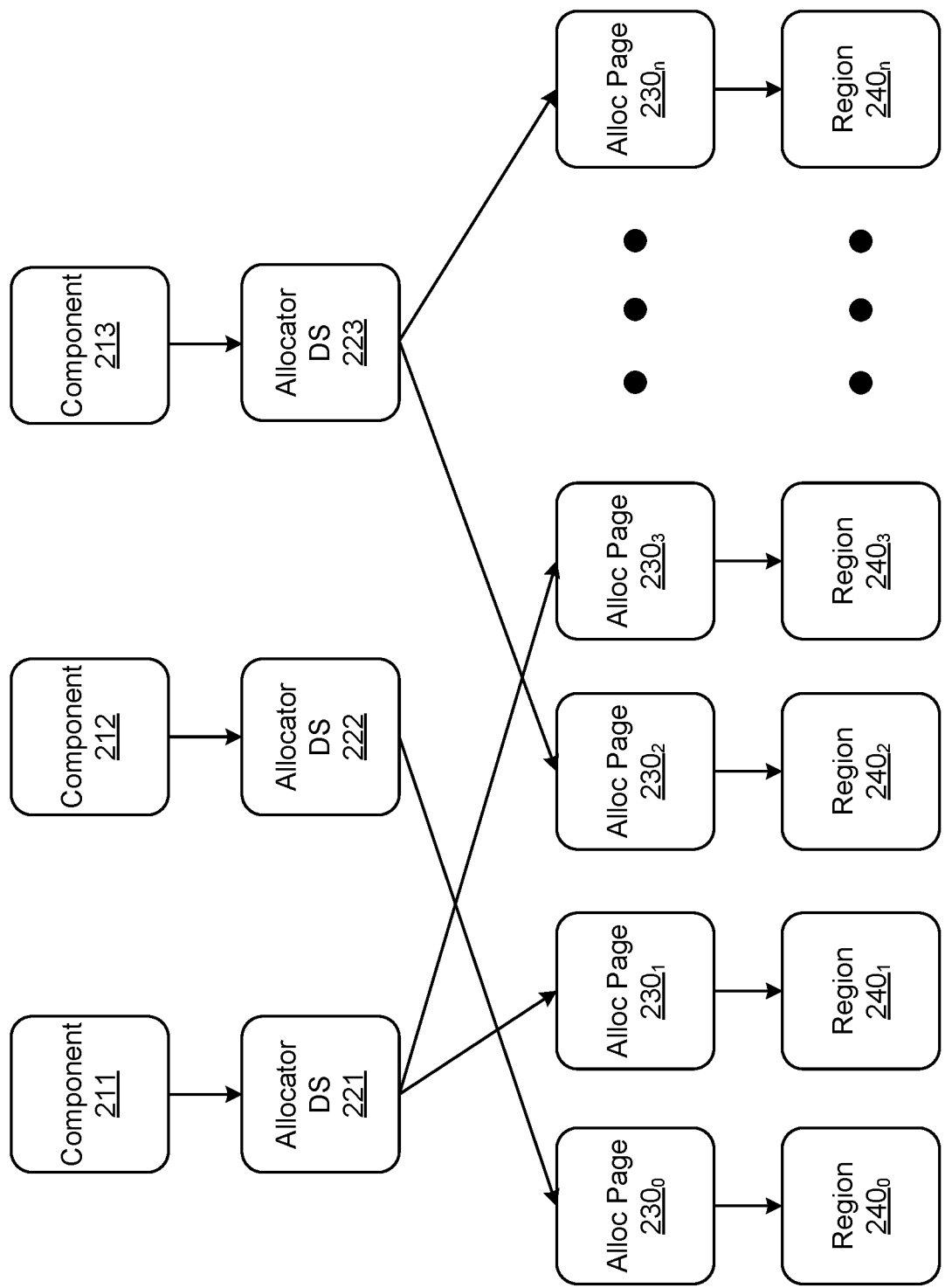
FIG. 2 is a block diagram illustrating page allocation according to various embodiments of the present disclosure.

FIG. 2 is a block diagram illustrating page allocation for block store 100 according to various embodiments of the present disclosure. As shown in FIG. 2, each of a plurality of components 211-213 each maintain a respective allocator data structure (DS) 221-223 that manages one or more allocator pages (alloc pages) $230_0$-$230_n$, which each provide information on a respective region $240_0$-$240_n$, as is described in further detail below.

Block store 100 employs a data structure, referred to herein as an "allocator," for performing free-space management within block store 100 in a persistent manner (e.g., on a backing store). Each allocator provides an Allocate(num ids) and Deallocate(id list) API for allocating and deallocating blocks identified by IDs. In some examples, an ID may be a 64-bit integer. The range of the IDs is determined by the set of allocator pages maintained by the allocator.

To perform free space management in block store 100, each allocator maintains a set of allocator pages. Each allocator page is organized as a bitmap, where each bit of the bitmap represents an ID in the ID-allocation space. The size of the allocator page is chosen as the unit of atomic input/output (I/O) in backing store 140, which is typically 4 kB for SSDs. Therefore, a single 4 kB allocator page contains $2^{12}$ bytes, or $2^{15}$ bits, which therefore represent $2^{15}$=32,768 IDs. Each allocator page is associated with a number that places the allocator page within the global ID allocation space. Therefore, allocator page number 0 represents IDs 0-32,767, allocator page number 1 represents IDs 32,768-65,535, and so on. An allocator instance may maintain a set of allocator pages that are not contiguous. The union of the IDs represented by those allocator pages defines the range of IDs that can be allocated using the allocator.

Block store 100 uses the allocators to perform fixed sized block allocations from backing store 140. For example, block store 100 can be formatted with a block size of 8 kB, which means that block store 100 allocates 8 kB of storage when allocating a single block. When using an allocator for free space management in block store 100, each ID represents a single block. Therefore, every ID represents 8 kB of storage in this example. As a result, a single 4 kB allocator page 230 represents $2^{15}$=32,768 blocks, which is equal to $2^{15}*8$ kB=$2^{28}$ bytes=256 MB of storage.

Given the size of storage that is managed by a single allocator page 230, backing store 140 is divided into regions 240, where each region 240 is a chunk of storage (256 MB in our example) that can be managed by a single allocator page 230. As an example, when backing store 140 is 1 PB ($2^{50}$ bytes) in size, backing store 140 has $2^{50}/2^{28}=2^{22}$=4 million regions 240. Because each region 240 uses a single allocator page 230, a 1 PB backing store 140 has 4 million allocator pages 230 to manage the free space at an 8 kB block size granularity.

Block store 100 exposes the concept of a component 211-213 to an application, such as one of the applications 151-153. Each component 211-213 maintains a corresponding set of regions 240 within backing store 140 from where the component 211-213 allocates blocks. This technique prevents the allocation behavior of one component 211-213 from impacting any other components 211-213. For example, if one component 211-213 has an allocation pattern that causes a lot of fragmentation in the allocation space, the fragmentation is limited to the regions 240 owned by that component 211-213 and does not impact other components 211-213.

To facilitate the use of components 211-213, block store 100 maintains a respective hierarchical block allocator data structure 221-223 for each component 211-213. The root level of each allocator data structure 221-223 is used for allocating regions 240. Each component 211-213 dynamically allocates regions 240 on demand. When a new component 211-213 is generated, the new component 211-213 starts out with just one region 240 allocated dynamically by a region allocator, and when all blocks are allocated from the current set of allocated regions 240, a new region 240 is dynamically allocated. When all blocks in a region 240 are deallocated, region 240 is returned back to the region allocator for later allocation.

Each component 211-213 maintains a block allocator for allocating blocks from the set of regions that have been allocated by the respective component 211-213. Both the region allocator and the per-component block allocators are instances of the allocator described above. In case of the region allocator, each bit in an allocator page represents a region 240. For 4 million ($2^{22}$) regions 240, $2^{22}/2^{15}=128$ allocator pages are used. These 128 allocator pages are allocated statically during the block store format operation and added to the region allocator in one pass.

For each component block allocator, each bit in an allocator page 230 represents a single 8 kB block. Because there is no limit on the number of allocator pages 230 a component 211-213 may allocate, each block allocator is able to manage the maximum possible number of allocator pages 230, which is 4 million in the 1 PB backing store example. To address this issue, each allocator data structure 221-223 should be persistent and crash consistent. In addition, each allocator data structure 221-223 should efficiently select the next allocator page 230 to allocate blocks from, such as from allocator page 230 with a maximum number of blocks available for allocation. Further, each allocator data structure 221-223 should be able to track the free-block-counts across millions of allocator pages 230 while also being memory efficient.

To address this issue, each allocator data structure 221-223 is a sparse allocation heap data structure which is space-efficient on backing store 140, such as when a component 211-213 allocates a small subset of allocator pages 230 from the entire range of allocator pages 230 using the region allocator.

As is described in further detail below, lookup of an allocator page 230 within an allocator data structure 221-223 to find an allocator page 230 with a maximum number of free IDs is O(1). Updating the number of free IDs in an allocator page 230 is O(log(n)) and the number of backing store accesses is a constant for all practical purposes. In addition, each allocator data structure 221-223 is sparse because storage for only the nodes needed for managing a given set of allocator pages 230 are allocated on backing store 140.

Each allocator data structure 221-223 is organized as a tree where each node of the tree is organized internally as a heap. Each node has an 8-byte header at the beginning after a 4-byte checksum:

struct Header {
//The number of allocator pages (if this is a leaf node) or child nodes
//(if this is an internal node) currently tracked by this node.
uint16 heap_size;
//Level of this node in the data structure. Levels increase from the
//leaf to the root, starting at zero at the leaf.
uint8 level;
//Unused byte.
uint8 unused;
}__attribute_((packed));

Each node in an allocator data structure 221-223 is organized as a heap of elements such that each element is a pair of the form (allocator page number, number of free IDs in allocator page 230). The heap is ordered as a max-heap on the number of free IDs in allocator page 230 in each pair. As a result, the allocator page number with the maximum number of free IDs within the range of the allocator pages 230 managed by the node is performed using an O(1) lookup of the heap.

Each element in the heap is organized as:

```
struct Entry1 {
    // The number of free IDs in the allocator page.
    int free_id_count;
    // The allocator page number within this node.
    uint16 allocator_page_num;
} ___attribute___((packed));
struct Entry2 {
    // The allocator page number within this node.
    uint16 allocator_page_num;
    // The number of free IDs in the allocator page.
    int free_id_count;
} ___attribute___((packed));
```

In some embodiments, because each element in a heap is 6-bytes in size, when generatiung an array of such pairs for the heap, the pairs alternate between Entry1 and Entry2 to keep free_id_count 4-byte aligned in each element to avoid unaligned accesses in the CPU.

Each allocator data structure 221-223 includes two types of nodes: leaf nodes and parent nodes. Each leaf node includes a 4-byte checksum, an 8-byte header, the heap array of entries described above, and an array of heap indices. The array of heap indices is indexed by the allocator page number (relative to the first allocator page number managed by the node). Each entry of the array of heap indices is a 2-byte index into the heap array. The array of heap indices is used to quickly locate the entry in the heap corresponding to an allocator page 230 when the number of free IDs for that allocator page 230 needs to be updated. Once the entry in the heap is located, the allocator performs a standard heap sift-up operation and/or sift-down operation to update the number of free IDs and then update the index for the allocator page 230 in the array of heap indices accordingly.

For every allocator page entry, the leaf node has a 6-byte entry in the heap array and a 2-byte entry in the array of heap indices for a total of 8-bytes per allocator page 230. Given a 4 kB node size, a leaf node can manage (4 kB−4 bytes (checksum)−8 bytes (header))/8 allocator pages=510 allocator pages 230.

A parent node is organized as a heap itself but also contains pointers to children heap nodes, which could either be parent nodes or leaf nodes when the parent node is located in the second to last level of the allocator data structure 221-223 tree. Each entry in the heap of a parent node corresponds to the maximum entry in the corresponding heap of the child node. As a result, the maximum entry in the root node of the allocator data structure 221-223 tree corresponds to the allocator page 230 with the maximum number of free IDs across all allocator pages 230 in the corresponding allocator data structure 221-223. Each parent node includes a 4-byte checksum, an 8-byte header, a heap array, an array of heap indices, and an array of child node offsets. The array of heap indices is indexed by the child node number in this parent node. Each entry of the array of heap indices is a 2-byte index into the heap array. The array of heap indices is used to quickly locate the entry in the heap corresponding to a child node when the maximum entry of the child node changes and the entry in this parent node has to be updated. Once the entry in the heap is located, a standard heap sift-up operation and/or sift-down operation is used to update the number of free IDs and then update the index for the child in the array of heap indices of this parent node. The array of child node offsets is indexed by the child node number in this parent node, where each entry is an 8-byte offset in backing store 140 where the corresponding child node resides.

For every child node, the parent node has a 6-byte entry in the heap, a 2-byte entry in the array of heap indices, and an 8-byte entry in the array of offsets for a total of 16-bytes per child node. Given a 4 kB node size, a parent node can manage (4 kB−4 bytes (checksum)−8 bytes (header))/16 child nodes=255 child nodes.

Figure 3A:
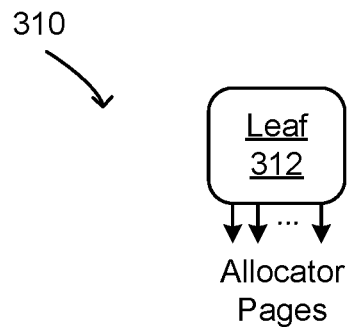
FIGS. 3A-3C are block diagrams illustrating allocator data structures according to various embodiments of the present disclosure.
Figure 3B:
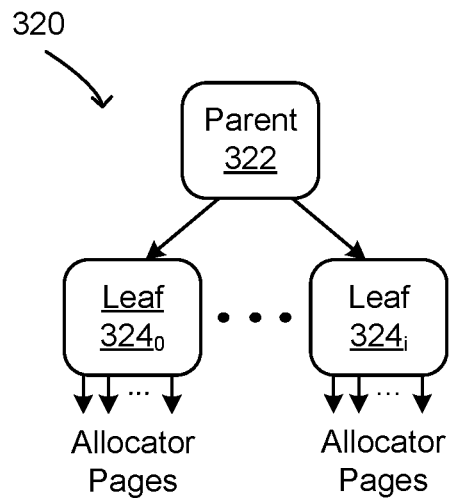
Figure 3C:
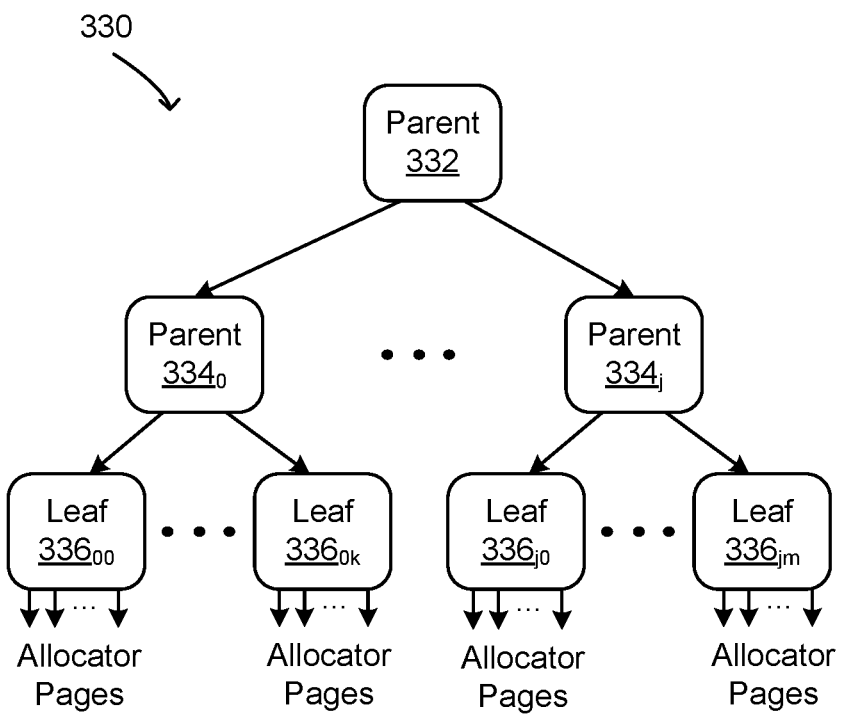

FIGS. 3A-3C are block diagrams illustrating allocator data structures according to various embodiments of the present disclosure. As shown, each of FIGS. 3A-3C show allocator data structures 310, 320, 330 having trees of different height, where each of the allocator data structures 310, 320, 330 may be consistent with any of the allocator data structures 221-223 of FIG. 2. FIG. 3A shows an allocator data structure 310 having a height of 1 and only a single leaf node 312. FIG. 3B shows an allocator data structure 320 having a height of 2 with a single parent node 322 tracking leaf nodes $324_0$-$324_1$. FIG. 3C shows an allocator data structure with a height of 3, with a first parent node 332 tracking a second layer of parent nodes $334_0$-$334_j$. Each of the parent nodes $334_0$-$334_j$ in the second layer further tracks is own set of leaf nodes 336.

Referring back to FIG. 2, the number of levels in each of allocator data structures 221-223 used to manage free space in a 1 PB backing store, assuming an 8 kB block size, 4 kB allocator pages and 4 kB heap nodes may now be determined. A single 4 kB allocator page 230 manages 2^28 (256 MB) of storage when the block size is 8 kB. Because each 4 kB leaf node of a heap can manage 510 allocator pages 230, a single leaf node of an allocator data structure 221-223 can manage 510*2^28 (approximately 2^37=128 GB) of storage space. As a result, for a 1 PB (2^50 bytes) blocking store, approximately 2^50/2^37=8192 leaf nodes are used. Because each parent node can manage 255 child nodes, the second to last level of the tree uses 8192/255 parent nodes=32 parent nodes. These 32 parent nodes can be managed by a single additional parent node which becomes the root of the tree, for a total of 3 levels in the allocator data structure 221-223 tree.

Thus, to manage free space on a 1 PB backing store with an 8 kB block size and 4 million 4 kB allocator pages 230, an allocator data structure 221-223 uses a 3-level tree of parent and leaf nodes (e.g., allocator data structure 330). For performing a lookup of the allocator data structure 221-223 to identify the allocator page 230 with the maximum number of free blocks), a lookup on the root node can be performed using an O(1) access to get the desired allocator page 230. Because the root node is very likely to be cached in memory, the entire lookup becomes an O(1) in-memory operation. To update the number of free-blocks in an allocator page 230, an update is made to the leaf-node managing that allocator page 230, which requires a single backing store access and an O(log(n)) in-memory sift-up operations and/or sift-down operations within the node. When the maximum entry of the leaf-node changes as a result of the update, the parent node is updated as well, and so on. In the worst case, an update requires 3 backing store accesses when all 3 levels of the allocator data structure 221-223, 330 tree have to be updated.

Performance may be improved and the space utilized by the allocator data structures 221-223 may be reduced by making each allocator data structure 221-223 sparse. When a block store component is generated, the block store component starts out with just one allocator page 230/leaf node 312. Instead of pre-generating the entire heap data structure for the entire backing store 140 (e.g., with all 3 levels, all 8192 leaf nodes, all 32 parent nodes, and a top-level parent node), a heap data structure (e.g., allocator data structure 310) is initially generated with just one leaf node. This leaf node initially manages the single allocator page 230 allocated to a component 211-213. When component 211-213 allocates a new allocator page 230 from the region allocator (e.g., because there is insufficient free space managed by the allocator data structure 221-223 to satisfy a block allocation request), a determination is made as to whether the new allocator page 230 can be managed by the existing nodes in the allocator data structure 221-223. If not, a new leaf node 324, 336 is allocated for managing the new allocator page 230 and the allocator data structure 221-223 tree is traversed upwards, recursively allocating parent nodes 322, 332, 334 until an existing parent node 322, 332, 334 is found which can manage the subtree containing the new leaf node 324, 336. In the worst case, a new level is added to the allocator data structure 221-223 tree. For example, because the allocator data structure 221-223 tree includes at most 3 levels for managing a 1 PB backing store with an 8 kB block size, in the worst case, at most one leaf node 324, 336 and up to two parent nodes 322, 332, 334 are allocated when a new allocator page 230 is added to the allocator data structure 221-223. Accordingly, the number of levels in the allocator data structure 221-223 tree as well as the storage requirements for the allocator data structure 221-223 on the backing store remain proportional to the number of allocator pages 230 added to the allocator data structure 221-223, regardless of the size of the entire ID-range managed by the corresponding allocator.

Figure 4:
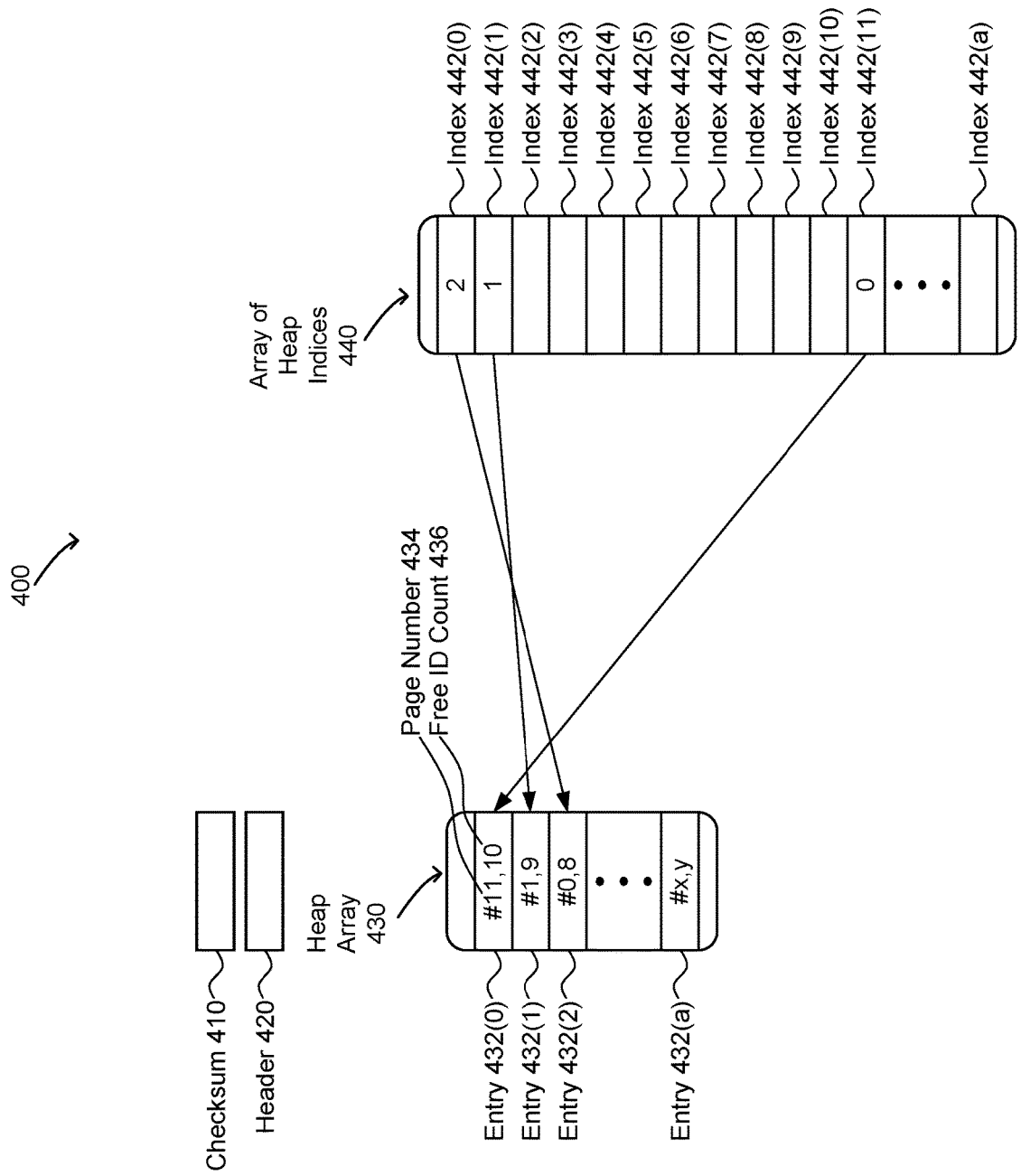
FIG. 4 illustrates a leaf node data structure according to various embodiments of the present disclosure.

FIG. 4 illustrates a leaf node data structure 400 according to various embodiments of the present disclosure. As shown, leaf node data structure 400 includes, without limitation, a checksum 410, a header 420, a heap array of entries 430, and an array of heap indices 440.

Checksum 410 is a 4-byte field with a value based on the other data bytes in leaf node data structure 400. Each time one or more data bytes in leaf node data structure 400 is changed, the allocator recomputes and stores checksum 410 before writing leaf node data structure 400 to backing store 140 and/or caching leaf node data structure 400. When reading leaf node data structure 400 from backing store 140, the allocator verifies that checksum 410 is correct.

Header 420 is an 8-byte field that includes a value indicating the number of allocator pages currently managed by leaf node data structure 400. Header 420 further includes a value indicating the level of the node represented by leaf node data structure 400. As described herein, the level of a leaf node is 0.

Heap array of entries 430 includes an entry 432(0)-432(a) for each allocator page managed by leaf node data structure 400, where 'a' is one less than the maximum number of allocator pages managed by leaf node data structure 400. Because a 4 kB leaf node data structure 400 is able to manage up to 510 allocator pages, a=509 for a 4 kB leaf node data structure 400. Each entry 432(0)-432(a) includes a page number 434 indicating the allocator page number relative to the first allocator page number managed by the leaf node. For example, three leaf nodes may each manage 510 allocator pages, where the page numbers 434 of each leaf node vary from 0 to 509. The first leaf node may manage allocator pages 0 to 509, the second leaf node may manage allocator pages 510 to 1019, and the third leaf node may manage allocator pages 1020 to 1529. The allocator page number corresponds to an index in array of heap indices 440. In that regard, entry 432(0) has an allocator page number of 11, corresponding to index 442(11) of array of heap indices 440. Entry 432(1) has an allocator page number of 1, corresponding to index 442(1) of array of heap indices 440. Entry 432(2) has an allocator page number of 0, corresponding to index 442(0) of array of heap indices 440, and so on.

Further, each entry 432(0)-432(a) includes a free ID count 436 indicating the number of free IDs remaining in the corresponding allocator page. In that regard, entry 432(0) has a free ID count of 10, indicating that allocator page 11 has 10 available free IDs. Entry 432(1) has a free ID count of 9, indicating that allocator page 1 has 9 available free IDs. Entry 432(2) has a free ID count of 8, indicating that allocator page 0 has 8 available free IDs, and so on. When a new entry 432 is added to heap array of entries 430, the allocator performs a sift-up operation and/or sift-down operation to place the new entry 432 into heap array of entries 430 in descending order of free ID count 436. In this manner, entries 432(0)-432(a) are arranged to satisfy the max-heap property, which is a partial ordering where an entry at index 'I' is greater than or equal to the entries at indices '2*I' and '2*I+1'. Because entries 432(0)-432(a) satisfy the max-heap property, the allocator is able to find the entry 432 with the highest free ID count in O(1) time, because this entry 432 is the first entry in heap array of entries 430. Further, because entries 432(0)-432(a) satisfy the max-heap property, the allocator is able to update heap array of entries 430 in O(log(N)) time.

Array of heap indices 440 is indexed by the allocator page number (relative to the first allocator page number managed by the node) specified by a corresponding entry 432. Each index 442 of array of heap indices 440 is a 2-byte index into heap array of entries 430. In that regard, index 442(0) has an index value of 2, corresponding to entry 432(2) of heap array of entries 430. Index 442(1) has an index value of 1, corresponding to entry 432(1) of heap array of entries 430. Index 442(11) has an index value of 0, corresponding to entry 432(0) of heap array of entries 430, and so on.

Figure 5:
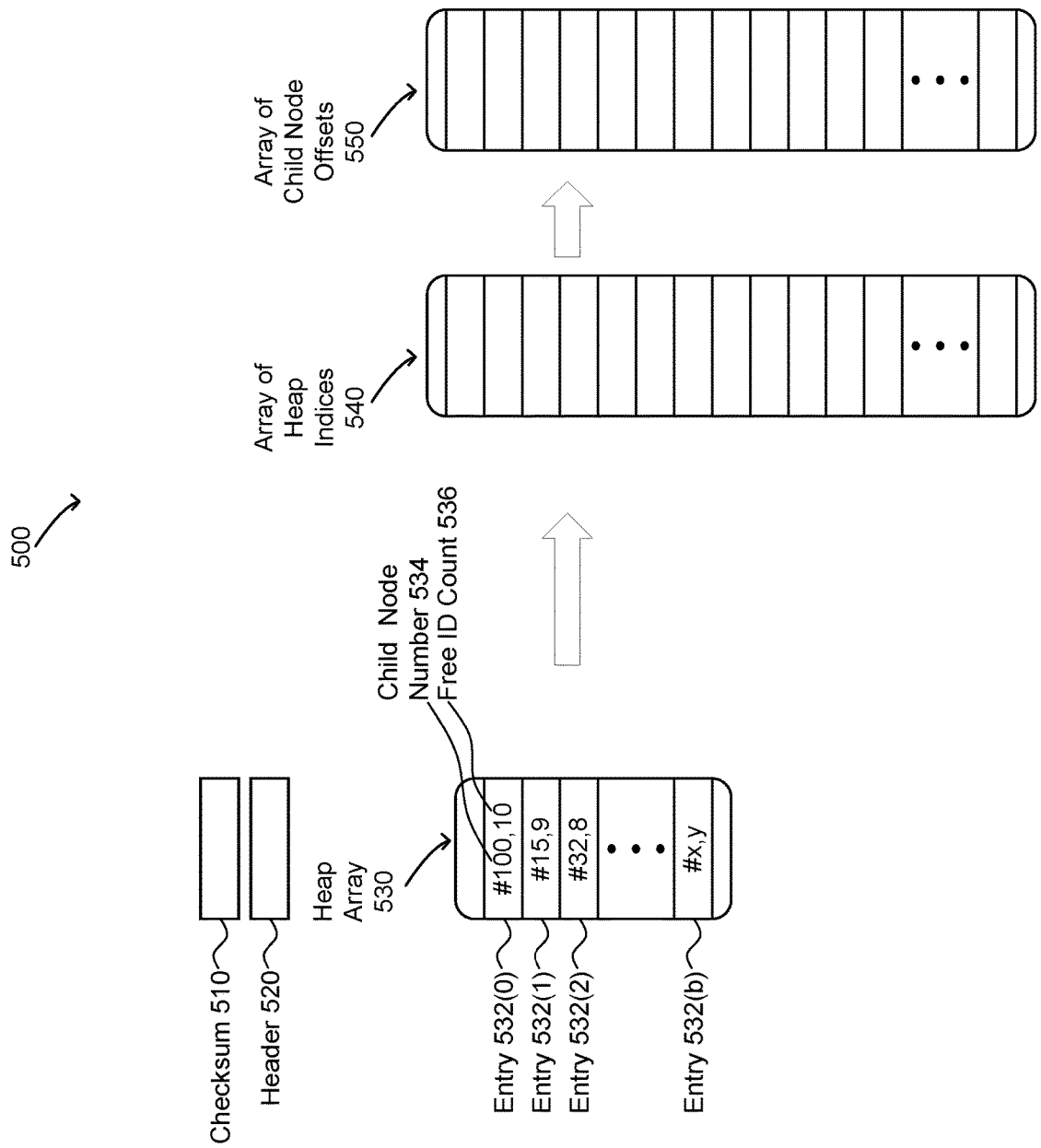
FIG. 5 illustrates a parent node data structure according to various embodiments of the present disclosure.

FIG. 5 illustrates a parent node data structure 500 according to various embodiments of the present disclosure. As shown, parent node data structure 500 includes, without limitation, a checksum 510, a header 520, a heap array of entries 530, an array of heap indices 540, and an array of child node offsets 550.

Checksum 510 is a 4-byte field with a value based on the other data bytes in parent node data structure 500. Each time one or more data bytes in parent node data structure 500 is changed, the allocator recomputes and stores checksum 510 before writing parent node data structure 500 to backing store 140 and/or caching parent node data structure 500. When reading parent node data structure 500 from backing store 140, the allocator verifies that checksum 510 is correct.

Header 520 is an 8-byte field that includes a value indicating the number of child nodes currently managed by parent node data structure 500. Header 520 further includes a value indicating the level of the node represented by parent node data structure 500. As described herein, if the child nodes of the parent node represented parent node data structure 500 are leaf nodes, then the level is 1. If the child nodes of the parent node represented parent node data structure 500 are level 1 parent nodes, then the level is 2, and so on.

Heap array of entries 530 includes an entry 532(0)-532(b) for each child node page managed by parent node data structure 500, where 'b' is one less than the maximum number of child nodes managed by parent node data structure 500. Because a 4 kB parent node data structure 500 is able to manage up to 255 child nodes, b=254 for a 4 kB parent node data structure 500. Each entry 532(0)-532(b) includes a child node number 534 indicating the child node number relative to the first child node number managed by the parent node. For example, three parent nodes may each manage 255 child nodes, where the child node numbers 534 of each parent node vary from 0 to 254. The first parent node may manage child nodes 0 to 254, the second leaf node may manage child nodes 255 to 509, and the third leaf node may manage child nodes 510 to 764. The child node number corresponds to an index in array of heap indices 540. In that regard, entry 532(0) has a child node page number of 100, corresponding to index 100 of array of heap indices 540. Entry 532(1) has a child node number of 15, corresponding to index 15 of array of heap indices 540. Entry 532(2) has a child node number of 32, corresponding to index 32 of array of heap indices 540, and so on.

Further, each entry 532(0)-532(b) includes a free ID count 536 indicating the free ID count of the entry in the corresponding child node with the largest number of free IDs. In that regard, entry 532(0) has a free ID count of 10, indicating that child node 11 has 10 available free IDs. Entry 532(1) has a free ID count of 9, indicating that child node 1 has 9 available free IDs. Entry 532(2) has a free ID count of 8, indicating that child node 0 has 8 available free IDs, and so on. When a new entry 532 is added to heap array of entries 530, the allocator performs a sift-up operation and/or sift-down operation to place the new entry 532 into heap array of entries 530 in descending order of free ID count 536. In this manner, entries 532(0)-532(b) are arranged to satisfy the max-heap property, which is a partial ordering where an entry at index 'I' is greater than or equal to the entries at indices '2*I' and '2*I+1'. Because entries 532(0)-532(b) satisfy the max-heap property, the allocator is able to find the entry 532 with the highest free ID count in O(1) time, because this entry 532 is the first entry in heap array of entries 530. Further, because entries 532(0)-532(b) satisfy the max-heap property, the allocator is able to update heap array of entries 530 in O(log(N)) time.

Array of heap indices 540 is indexed by the child node number (relative to the first child node number managed by the node) specified by a corresponding entry 532. Each index of array of heap indices 540 is a 2-byte index into heap array of entries 530. In that regard, index 100 has an index value of 0, corresponding to entry 532(0) of heap array of entries 530. Index 15 has an index value of 1, corresponding to entry 532(1) of heap array of entries 530. Index 32 has an index value of 2, corresponding to entry 532(2) of heap array of entries 530, and so on.

Array of child node offsets 550 is indexed by the child node number (relative to the first child node number managed by the node) specified by a corresponding entry 532. Each entry in array of child node offsets 550 is an 8-byte offset in backing store 140 where the corresponding child node resides. If the child nodes are leaf nodes, then each entry in array of child node offsets 550 is an 8-byte offset in backing store 140 where the corresponding leaf node data structure 400 resides. If the child nodes are parent nodes in a lower layer of the allocator data structure, then each entry in array of child node offsets 550 is an 8-byte offset in backing store 140 where the corresponding parent node data structure 500 of the lower layer resides.

In that regard, offset 100 of array of child node offsets 550 corresponds to index 100 of array of heap indices 540 which, in turn, corresponds to entry 532(0) of heap array of entries 530. Offset 100 of array of child node offsets 550 is an 8-byte offset in backing store 140 where the child node 100 resides. Offset 15 of array of child node offsets 550 corresponds to index 15 of array of heap indices 540 which, in turn, corresponds to entry 532(1) of heap array of entries 530. Offset 15 of array of child node offsets 550 is an 8-byte offset in backing store 140 where the child node resides. Offset 32 of array of child node offsets 550 corresponds to index 32 of array of heap indices 540 which, in turn, corresponds to entry 532(2) of heap array of entries 530. Offset 32 of array of child node offsets 550 is an 8-byte offset in backing store 140 where the child node 32 resides, and so on.

FIGS. 6A-6E illustrate how entries are added to leaf nodes 600 and parent nodes 610 and 620 of an allocator data structure according to various embodiments of the present disclosure. Each leaf node 600 corresponds to a different leaf node data structure 400 and, correspondingly, a different heap array of entries 430. For clarity, only a portion of each heap array of entries 430 is shown. Similarly, each parent node 610 and 620 corresponds to a different parent node data structure 500 and, correspondingly, a different heap array of entries 530. For clarity, only a portion of each heap array of entries 530 is shown.

Figures 6A, 6B:
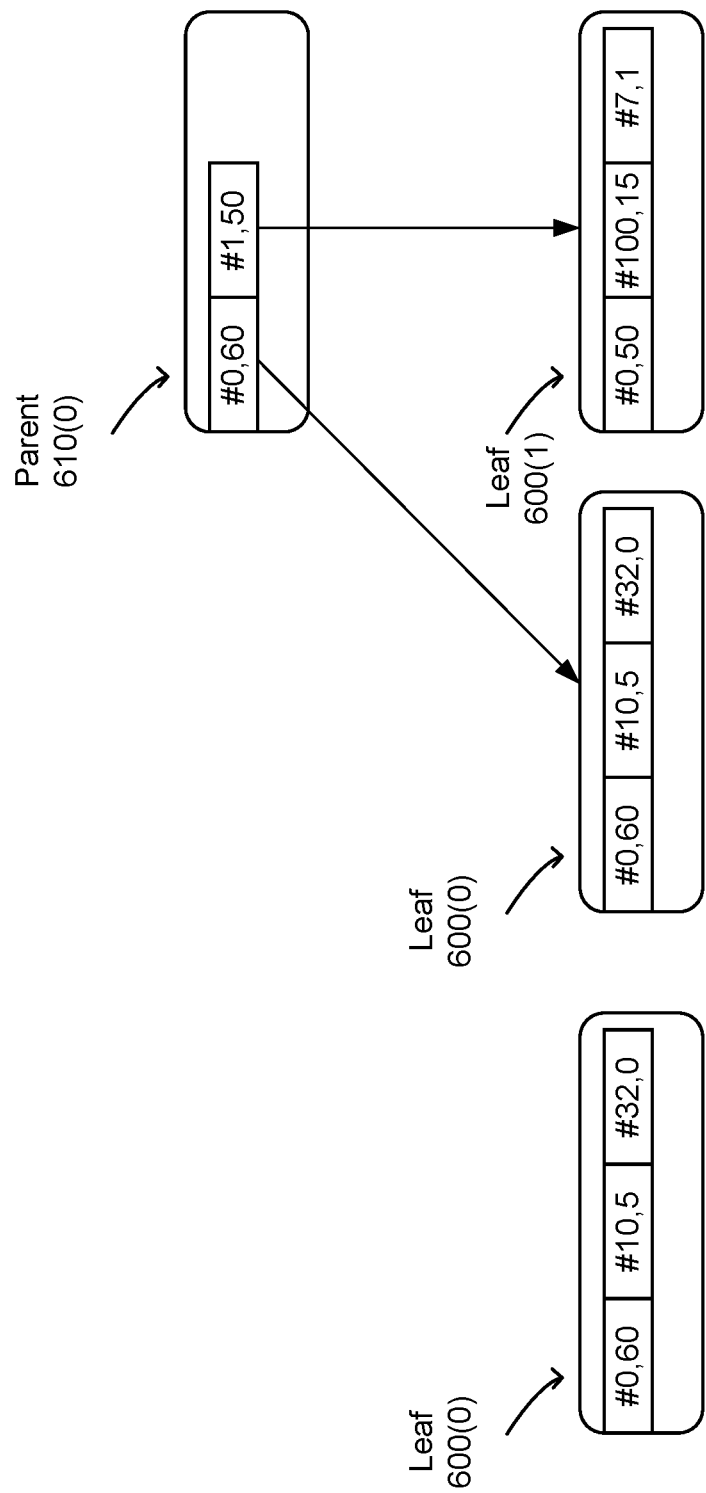
FIGS. 6A-6E illustrate how entries are added to leaf nodes and parent nodes of an allocator data structure according to various embodiments of the present disclosure.

As shown in FIG. 6A, the allocator data structure initially includes a single leaf node 600(0) and no parent nodes. Heap array of entries 430 for leaf node 600(0) includes three entries for allocator pages 0, 10, and 32 arranged to satisfy the max-heap property with free ID counts of 60, 5, and 0, respectively. As new allocator pages are added, the number of entries in heap array of entries 430 for leaf node 600(0) increases until the maximum number of entries is reached.

As shown in FIG. 6B, if an allocator page is added when heap array of entries 430 for leaf node 600(0) includes the maximum number of entries, then the allocator adds a parent node 610(0) and a second leaf node 600(1). Parent node 610(0) has two child nodes: leaf node 600(0) and leaf node 600(1). Heap array of entries 430 for leaf node 600(1) includes three entries for allocator pages 0, 100, and 7 arranged to satisfy the max-heap property with free ID counts of 50, 15, and 1, respectively.

Heap array of entries 430 for parent node 610(0) includes two entries corresponding to the two child nodes: leaf node 600(0) and leaf node 600(1). The first entry corresponds to child node 0, represented by leaf node 600(0). The first entry includes a free ID count of 60, corresponding to the highest free ID count in the heap array of entries 430 for leaf node 600(0). Similarly, the second entry corresponds to child node 1, represented by leaf node 600(1). The second entry includes a free ID count of 50, corresponding to the highest free ID count in the heap array of entries 430 for leaf node 600(1).

Figure 6C:
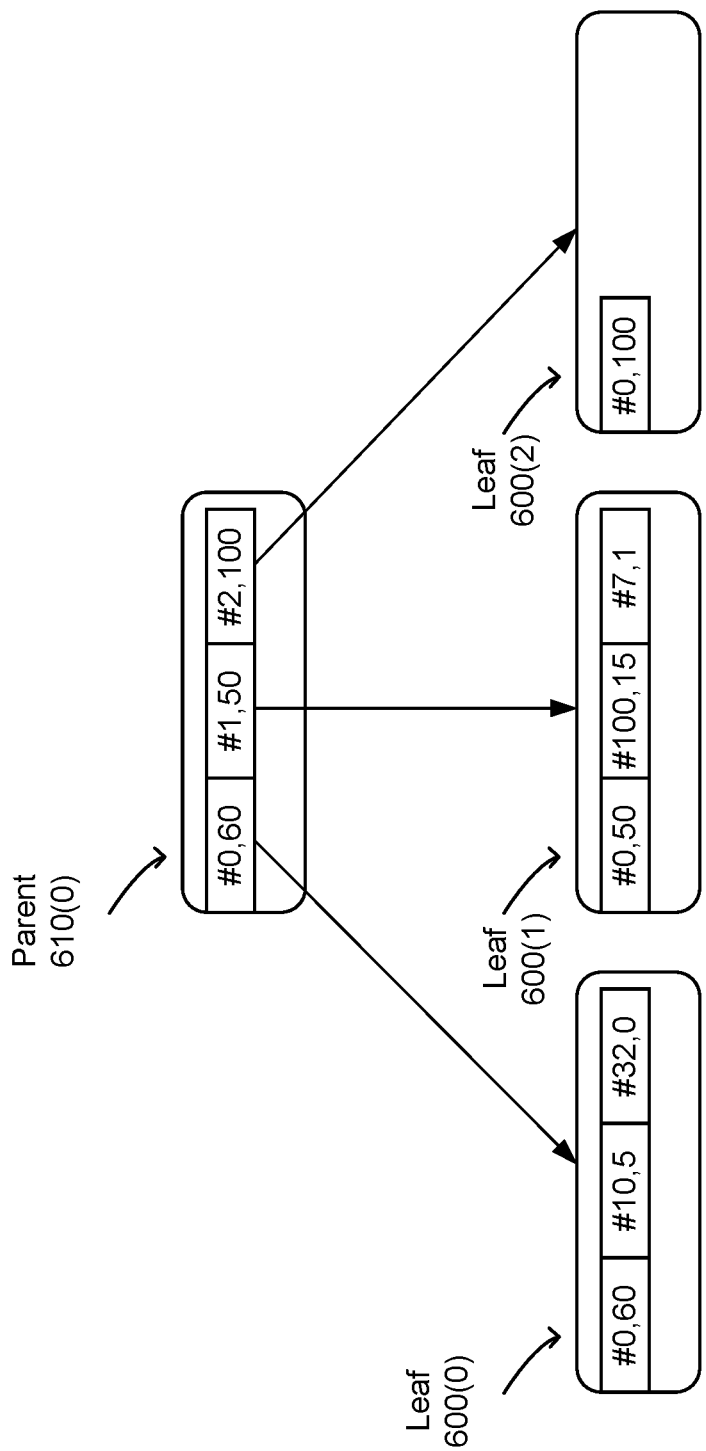

As shown in FIG. 6C, if an allocator page is added when heap array of entries 430 for leaf node 600(0) and heap array of entries 430 for leaf node 600(1) both include the maximum number of entries, then the allocator adds a third leaf node 600(2). Parent node 610(0) now has three child nodes: leaf node 600(0), leaf node 600(1), and leaf node 600(2). Heap array of entries 430 for leaf node 600(2) includes a single entry for allocator page 0 with a free ID count of 100. A third entry is added to heap array of entries 430 for parent node 610(0), where the third entry corresponds to child node 2, represented by leaf node 600(2). The third entry includes a free ID count of 100, corresponding to the highest free ID count in the heap array of entries 430 for leaf node 600(2).

Figure 6D:
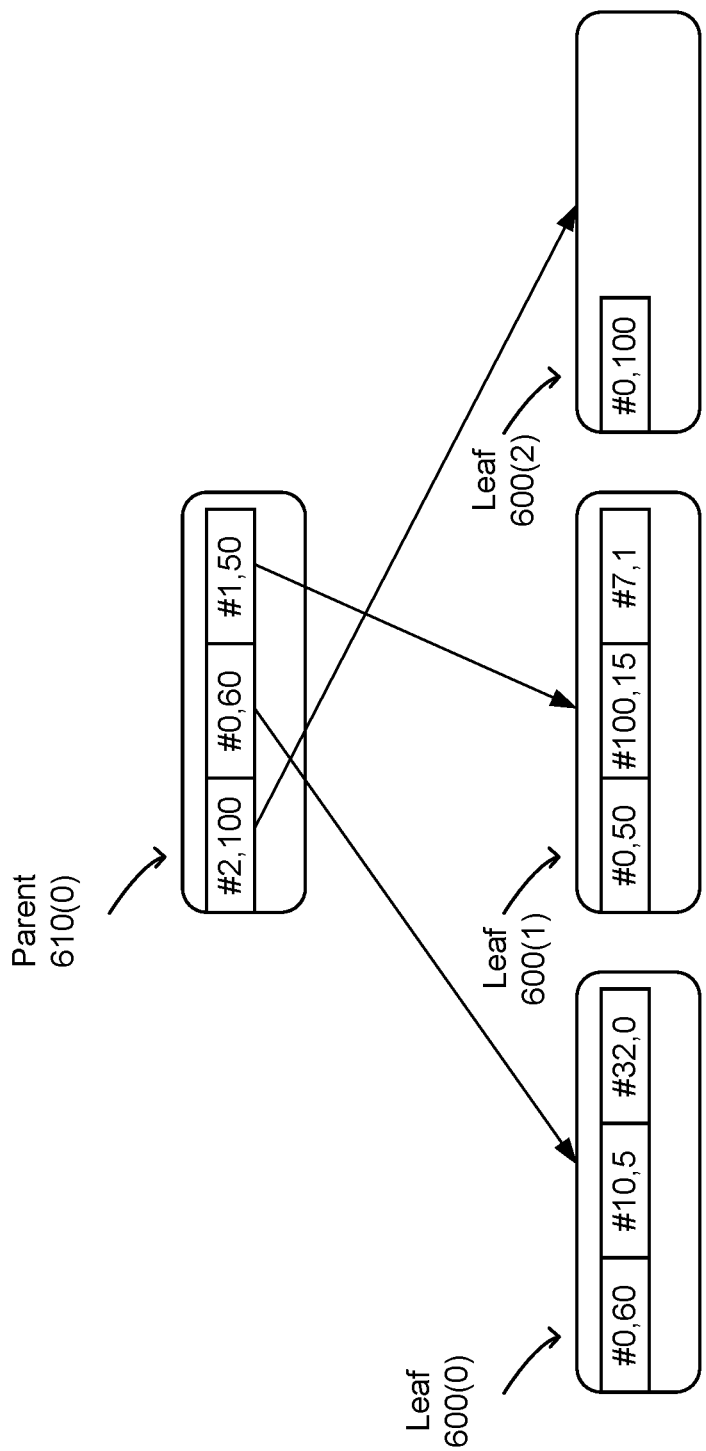

As a result of adding the third entry to heap array of entries 430 for parent node 610(0), the free ID counts no longer satisfy the max-heap property. Therefore, the allocator performs a sift-up operation and/or sift-down operation on the third entry in order to restore the max-heap property for the free ID counts. As shown in FIG. 6D, the three entries of heap array of entries 430 for parent node 610(0) are now in descending order of free ID count, namely, 100, 60, and 50, respectively. Correspondingly, the three entries point to child nodes 2, 0, and 1, corresponding to leaf nodes 600(2), 600(0), and 600(1), respectively.

Figure 6E:
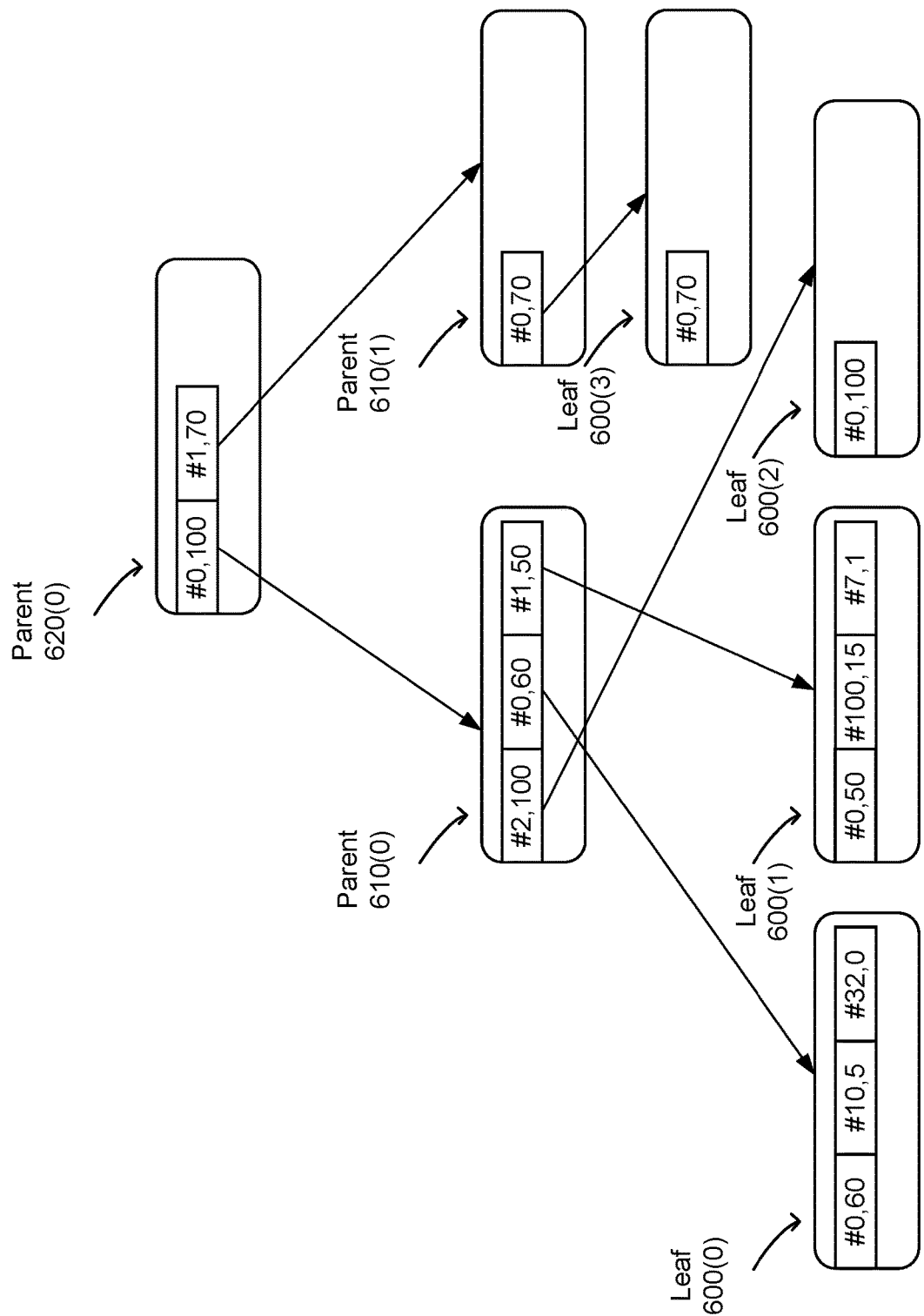

As shown in FIG. 6E, if an allocator page is added when heap array of entries 430 for all leaf nodes 600 and first level parent nodes include the maximum number of entries, then the allocator adds a second level parent node 620(0). As shown, second level parent node 620(0) has two child nodes: first level parent node 610(0) and first level parent node 610(1). First level parent node 610(0), in turn, has three child nodes: leaf nodes 600(0), 600(1), and 600(2). First level parent node 610(1) has a single child node: leaf node 600(3).

In this manner, allocator data structure is a sparse data structure that may grow from a single leaf node to a multi-layered hierarchical data structure with leaf nodes, first level parent nodes, second level parent nodes, and so on, as more blocks of backing store 140 are allocated over time.

Figure 7:
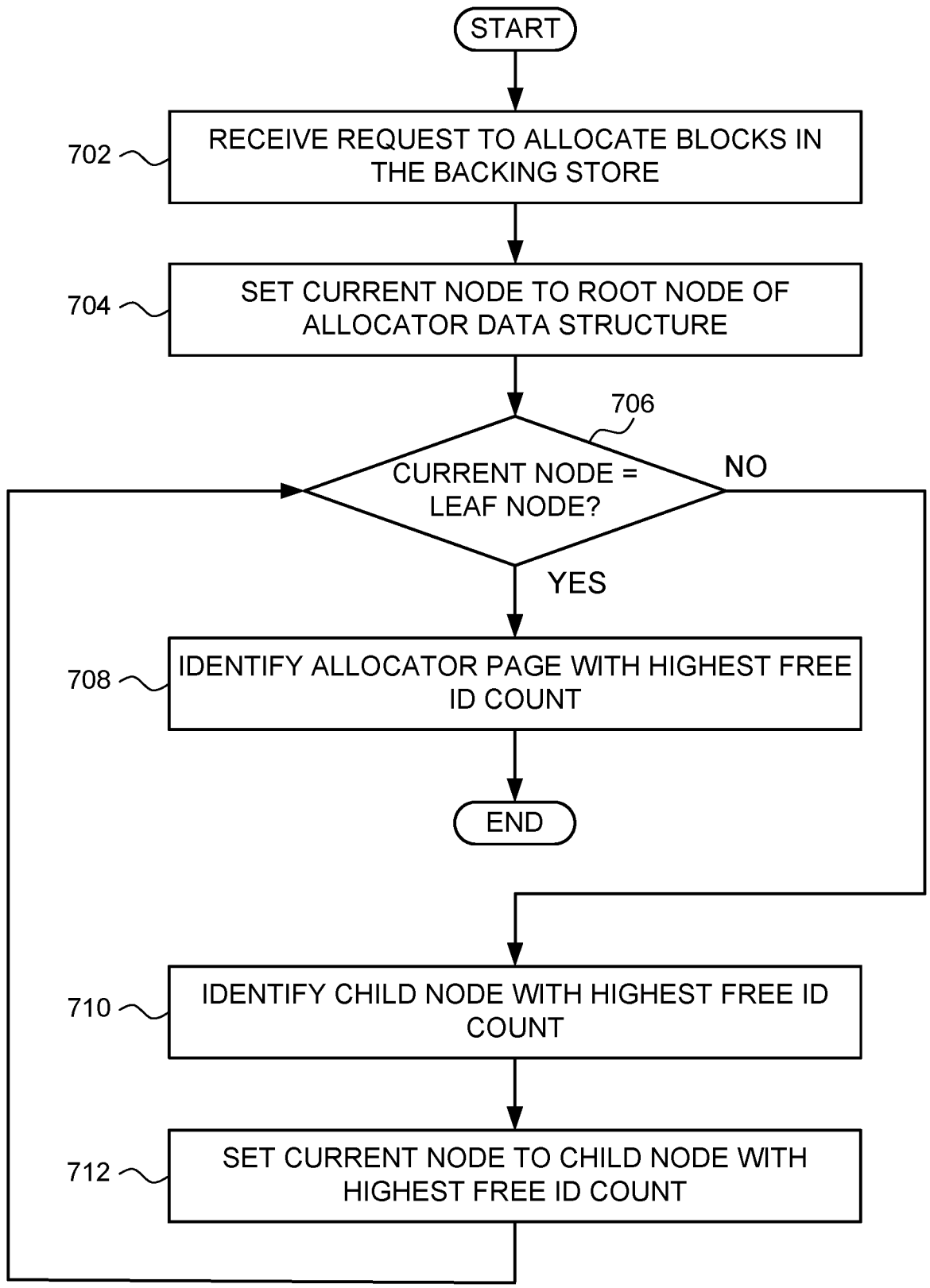
FIG. 7 is a flow diagram of method steps for searching an allocator data structure to identify a set of blocks in a backing store according to various embodiments of the present disclosure.

FIG. 7 is a flow diagram of method steps for searching an allocator data structure to identify a set of blocks in a backing store according to various embodiments of the present disclosure. Although the method steps are described in conjunction with the systems of FIGS. 1-6E and 9A-10, persons skilled in the art will understand that any system configured to perform the method steps, in any order, is within the scope of the present disclosure.

As shown, a method 700 begins at step 702, where an allocator executing on a computer system receives a request to allocate a set of blocks in a backing store 140. At step 704, the allocator sets the root node of the allocator data structure as the current node. At step 706, the allocator determines whether the current node is a leaf node. In so doing, the allocator accesses a level from the header field of the node data structure for the current node. If the value of the level is set to 0, then the allocator identifies the current node as a leaf node. In such cases, the method 700 proceeds to step 708, where the allocator identifies the entry associated with the current node that corresponds to the allocator page with the highest free ID count. If the entries of the heap array of entries for the current node satisfy the max-heap property for the free ID counts, then the first entry in the heap array of entries has the highest free ID count. The method 700 then terminates.

Returning to step 706, if the value of the level is not set to 0, then the allocator identifies the current node as a parent node. In such cases, the method 700 proceeds to step 710, where the allocator identifies the entry associated with the current node that corresponds to the child node with the highest free ID count. If the entries of the heap array of entries for the current node satisfy the max-heap property for the free ID counts, then the first entry in the heap array of entries has the highest free ID count. At step 712, the allocator sets the current node to the child node with the highest free ID count. In so doing, the allocator accesses the offset in the array of child node offsets associated with the entry that has the highest free ID count. This offset identifies the offset in backing store 140 where the corresponding child node resides. The method 700 then proceeds to step 706, described above.

Figure 8:
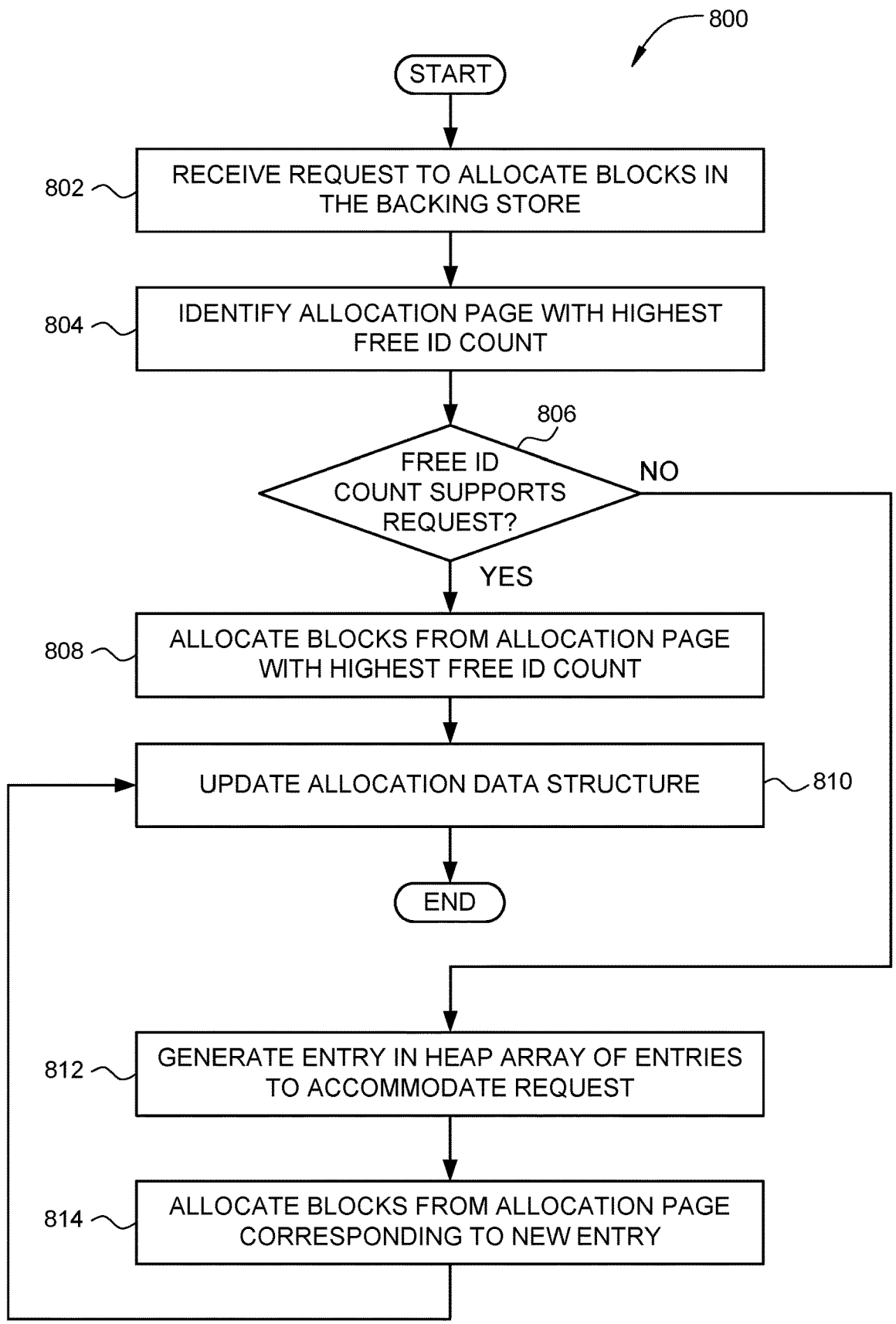
FIG. 8 is a flow diagram of method steps for searching an allocator data structure to allocate a set of blocks in a backing store according to various embodiments of the present disclosure.

FIG. 8 is a flow diagram of method steps for searching an allocator data structure to allocate a set of blocks in a backing store according to various embodiments of the present disclosure. Although the method steps are described in conjunction with the systems of FIGS. 1-6E and 9A-10, persons skilled in the art will understand that any system configured to perform the method steps, in any order, is within the scope of the present disclosure.

As shown, a method 800 begins at step 802, where an allocator executing on a computer system receives a request to allocate a set of blocks in a backing store 140. At step 804, the allocator identifies the allocator page corresponding to the entry within a leaf node in the allocator data structure that has the highest free ID count. In some embodiments, the allocator may identify such an allocator page in accordance with the method 700 described in conjunction with FIG. 7.

At step 806, the allocator determines whether the highest free ID count can support the allocation request. If the highest free ID count can support the allocation request, then the method 800 proceeds to step 808, where the allocator allocates blocks of the allocator page corresponding to the entry that has the highest free ID count and designates this entry as the current entry. At step 810, the allocator updates the allocator data structure to reflect the allocation of blocks. In so doing, the allocator reduces the free ID count of the current entry to reflect the allocation of blocks. If the current entry was the entry that had the highest free ID count prior to the allocation and now no longer has the highest free ID count, then the allocator propagates the allocator page number and the free ID count of the entry with the highest free ID count to one or more parent nodes to reflect the highest free ID count at each parent node. Similarly, if the current entry is a new entry that has the highest free ID count relative to the other entries in the leaf node, then the allocator propagates the free ID count of the current entry to one or more parent nodes to reflect the highest free ID count at each parent node.

More specifically, if an existing entry in a leaf node is modified or if a new entry is added to an existing leaf node, then the allocator performs a sift-up operation and/or sift-down operation to place the modified or new entry into the proper position. Prior to modifying an existing entry or adding a new entry, the entries of the leaf node are arranged to satisfy the max-heap property for the free ID counts. After modifying an existing entry or adding a new entry, the modified or new entry may be out of order with respect to the other entries. If the free ID count of the modified or new entry is greater than the parent entry in the heap array of entries in the leaf node, then the allocator performs a sift-up operation. The sift-up operation moves the modified or new entry to earlier positions in the leaf node until the entries again satisfy the max-heap properties for the free ID counts. Similarly, if the free ID count of the modified or new entry is less than either of the children entries of the heap array of entries in the leaf node, then the allocator performs a sift-down operation. The sift-down operation moves the modified or new entry to later positions in the leaf node until the entries again satisfy the max-heap properties for the free ID counts.

When a new entry is added, if the new entry does not belong to the range of allocator pages covered by any of the existing leaf nodes, then the allocator adds a new leaf node to the allocator data structure. The allocator then adds a new entry to the new leaf node. If the range of allocator pages covered by the leaf node is not covered by any of the existing level one parent nodes, then the allocator adds a new level one parent node to the allocator data structure and configures the level one parent node to manage the leaf node. As additional leaf nodes are added to the allocator data structure, the allocator configures the level one parent node to manage the new leaf nodes in addition to the existing leaf nodes.

When a new level one parent node is added, and if the range of allocator pages covered by the level one parent node is not covered by any of the existing level two parent nodes, then the allocator adds a new level one parent node. The allocator configures the new level one parent node to manage the new leaf node. In addition, the allocator adds a level two parent node and configures the level two parent node to manage the two level one parent nodes. As more entries are added, the allocator adds leaf nodes and parent nodes to the allocator data structure as needed to manage additional allocator pages. In this manner, the allocator grows the allocator data structure over time and as needed rather than initializing a fully configured allocator data structure prior starting the allocation process. After the allocator updates the allocator data structure to reflect the allocation of blocks, the method 800 then terminates.

Returning to step 806, if the highest free ID count cannot support the allocation request, then the method 800 proceeds to step 812, where the allocator generates a new entry in the heap array of entries in order to allocate the requested blocks. At step 814, the allocator allocates blocks of the allocator page corresponding to the new entry generated in step 812 and designates this entry as the current entry. The method 800 then proceeds to step 810, described above.

Exemplary Virtualization System Architectures

According to some embodiments, all or portions of any of the foregoing techniques can be partitioned into one or more modules and instanced within, or as, or in conjunction with a virtualized controller in a virtual computing environment. Some example instances within various virtual computing environments are shown and discussed in further detail in FIGS. 9A-9D. Consistent with these embodiments, a virtualized controller includes a collection of software instructions that serve to abstract details of underlying hardware or software components from one or more higher-level processing entities. In some embodiments, a virtualized controller can be implemented as a virtual machine, as an executable container, or within a layer (e.g., such as a layer in a hypervisor). Consistent with these embodiments, distributed systems include collections of interconnected components that are designed for, or dedicated to, storage operations as well as being designed for, or dedicated to, computing and/or networking operations.

In some embodiments, interconnected components in a distributed system can operate cooperatively to achieve a particular objective such as to provide high-performance computing, high-performance networking capabilities, and/or high-performance storage and/or high-capacity storage capabilities. For example, a first set of components of a distributed computing system can coordinate to efficiently use a set of computational or compute resources, while a second set of components of the same distributed computing system can coordinate to efficiently use the same or a different set of data storage facilities.

In some embodiments, a hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

In some embodiments, physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, and/or the like). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

Figure 9A:
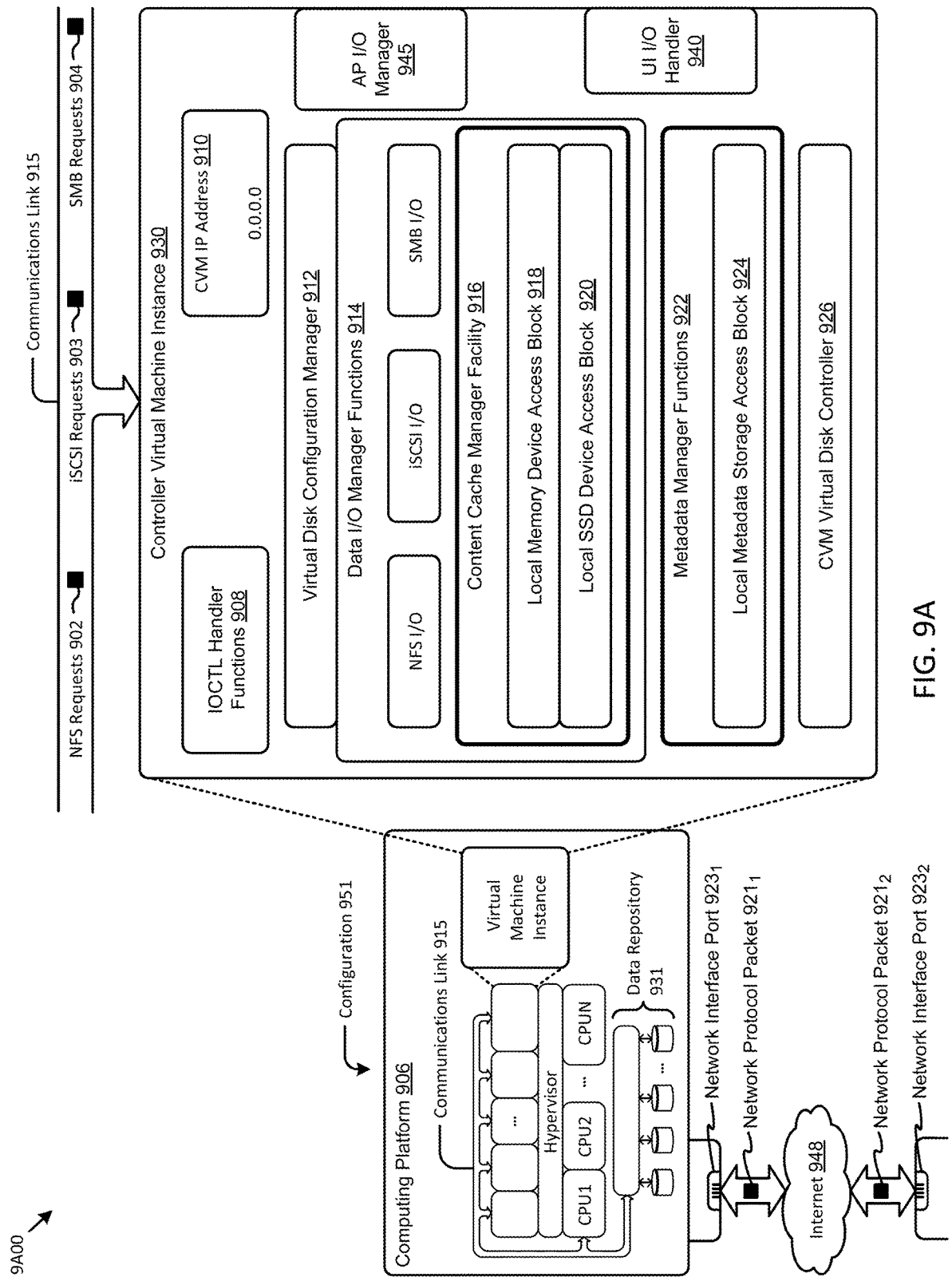
FIGS. 9A-9D are block diagrams illustrating virtualization system architectures configured to implement one or more aspects of the present embodiments.

FIG. 9A is a block diagram illustrating virtualization system architecture 9A00 configured to implement one or more aspects of the present embodiments. As shown in FIG. 9A, virtualization system architecture 9A00 includes a collection of interconnected components, including a controller virtual machine (CVM) instance 930 in a configuration 951. Configuration 951 includes a computing platform 906 that supports virtual machine instances that are deployed as user virtual machines, or controller virtual machines or both. Such virtual machines interface with a hypervisor (as shown). In some examples, virtual machines may include processing of storage I/O (input/output or IO) as received from any or every source within the computing platform. An example implementation of such a virtual machine that processes storage I/O is depicted as CVM instance 930.

In this and other configurations, a CVM instance receives block I/O storage requests as network file system (NFS) requests in the form of NFS requests 902, internet small computer storage interface (iSCSI) block 10 requests in the form of iSCSI requests 903, Samba file system (SMB) requests in the form of SMB requests 904, and/or the like. The CVM instance publishes and responds to an internet protocol (IP) address (e.g., CVM IP address 910). Various forms of input and output can be handled by one or more IO control handler functions (e.g., IOCTL handler functions 908) that interface to other functions such as data IO manager functions 914 and/or metadata manager functions 922. As shown, the data IO manager functions can include communication with virtual disk configuration manager 912 and/or can include direct or indirect communication with any of various block IO functions (e.g., NFS IO, iSCSI IO, SMB IO, and/or the like).

In addition to block IO functions, configuration 951 supports IO of any form (e.g., block TO, streaming TO, packet-based TO, HTTP traffic, and/or the like) through either or both of a user interface (UI) handler such as UI IO handler 940 and/or through any of a range of application programming interfaces (APIs), possibly through API IO manager 945.

Communications link 915 can be configured to transmit (e.g., send, receive, signal, and/or the like) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), formatting of bit fields into fixed-length blocks or into variable length fields used to populate the payload, and/or the like. In some cases, packet characteristics include a version identifier, a packet or payload length, a traffic class, a flow label, and/or the like. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

Computing platform 906 includes one or more computer readable media that is capable of providing instructions to a data processor for execution. In some examples, each of the computer readable media may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or random access persistent memories (RAPMs) or optical or magnetic media drives such as paper tape or magnetic tape drives. Volatile media includes dynamic memory such as random access memory (RANI). As shown, controller virtual machine instance 930 includes content cache manager facility 916 that accesses storage locations, possibly including local dynamic random access memory (DRAM) (e.g., through local memory device access block 918) and/or possibly including accesses to local solid state storage (e.g., through local SSD device access block 920).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of data repository 931, which in turn can be formatted into any one or more storage areas, and which can comprise parameterized storage accessible by a key (e.g., a filename, a table name, a block address, an offset address, and/or the like). Data repository 931 can store any forms of data, and may comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 924. The data repository 931 can be configured using CVM virtual disk controller 926, which can in turn manage any number or any configuration of virtual disks.

Execution of a sequence of instructions to practice certain of the disclosed embodiments is performed by one or more instances of a software instruction processor, or a processing element such as a data processor, or such as a central processing unit (e.g., CPU1, CPU2, CPUN). According to certain embodiments of the disclosure, two or more instances of configuration 951 can be coupled by communications link 915 (e.g., backplane, LAN, PSTN, wired or wireless network, and/or the like) and each instance may perform respective portions of sequences of instructions as may be required to practice embodiments of the disclosure.

The shown computing platform 906 is interconnected to the Internet 948 through one or more network interface ports (e.g., network interface port 9231 and network interface port 9232). Configuration 951 can be addressed through one or more network interface ports using an IP address. Any operational element within computing platform 906 can perform sending and receiving operations using any of a range of network protocols, possibly including network protocols that send and receive packets (e.g., network protocol packet 9211 and network protocol packet 9212).

Computing platform 906 may transmit and receive messages that can be composed of configuration data and/or any other forms of data and/or instructions organized into a data structure (e.g., communications packets). In some cases, the data structure includes program instructions (e.g., application code) communicated through the Internet 948 and/or through any one or more instances of communications link 915. Received program instructions may be processed and/or executed by a CPU as it is received and/or program instructions may be stored in any volatile or non-volatile storage for later execution. Program instructions can be transmitted via an upload (e.g., an upload from an access device over the Internet 948 to computing platform 906). Further, program instructions and/or the results of executing program instructions can be delivered to a particular user via a download (e.g., a download from computing platform 906 over the Internet 948 to an access device).

Configuration 951 is merely one example configuration. Other configurations or partitions can include further data processors, and/or multiple communications interfaces, multiple storage devices, and/or the like within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

In some embodiments, a module can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, and/or the like). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to management of block stores. Various implementations of the data repository comprise storage media organized to hold a series of records and/or data structures.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 9B:
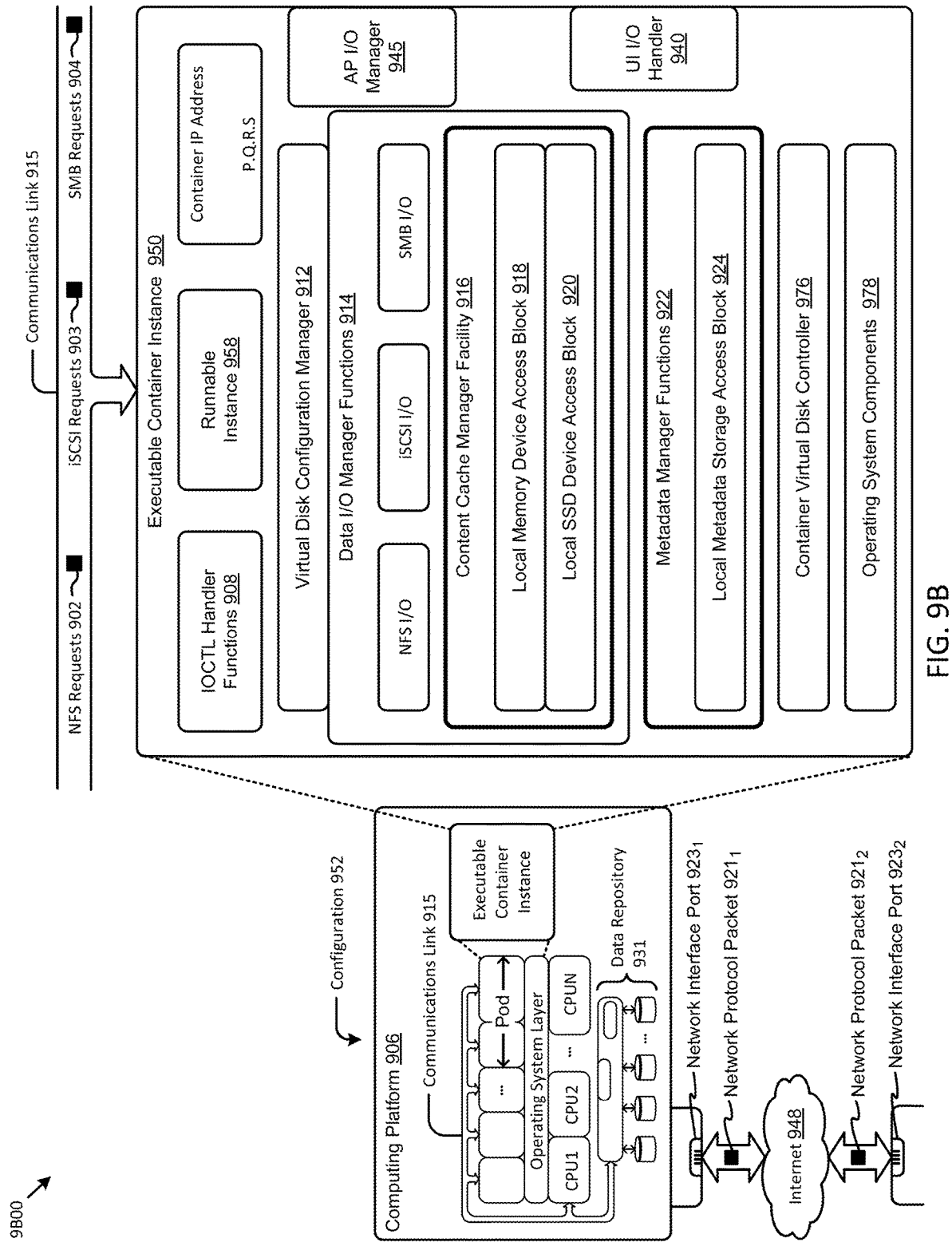

FIG. 9B depicts a block diagram illustrating another virtualization system architecture 9B00 configured to implement one or more aspects of the present embodiments. As shown in FIG. 9B, virtualization system architecture 9B00 includes a collection of interconnected components, including an executable container instance 950 in a configuration

952. Configuration 952 includes a computing platform 906 that supports an operating system layer (as shown) that performs addressing functions such as providing access to external requestors (e.g., user virtual machines or other processes) via an IP address (e.g., "P.Q.R.S", as shown). Providing access to external requestors can include implementing all or portions of a protocol specification (e.g., "http:") and possibly handling port-specific functions. In some embodiments, external requestors (e.g., user virtual machines or other processes) rely on the aforementioned addressing functions to access a virtualized controller for performing all data storage functions. Furthermore, when data input or output requests are received from a requestor running on a first node are received at the virtualized controller on that first node, then in the event that the requested data is located on a second node, the virtualized controller on the first node accesses the requested data by forwarding the request to the virtualized controller running at the second node. In some cases, a particular input or output request might be forwarded again (e.g., an additional or Nth time) to further nodes. As such, when responding to an input or output request, a first virtualized controller on the first node might communicate with a second virtualized controller on the second node, which second node has access to particular storage devices on the second node or, the virtualized controller on the first node may communicate directly with storage devices on the second node.

The operating system layer can perform port forwarding to any executable container (e.g., executable container instance 950). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance can serve as an instance of an application container or as a controller executable container. Any executable container of any sort can be rooted in a directory system and can be configured to be accessed by file system commands (e.g., "ls" or "ls-a", and/or the like). The executable container might optionally include operating system components 978, however such a separate set of operating system components need not be provided. As an alternative, an executable container can include runnable instance 958, which is built (e.g., through compilation and linking, or just-in-time compilation, and/or the like) to include all of the library and OS-like functions needed for execution of the runnable instance. In some cases, a runnable instance can be built with a virtual disk configuration manager, any of a variety of data IO management functions, and/or the like. In some cases, a runnable instance includes code for, and access to, container virtual disk controller 976. Such a container virtual disk controller can perform any of the functions that the aforementioned CVM virtual disk controller 926 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 9C:
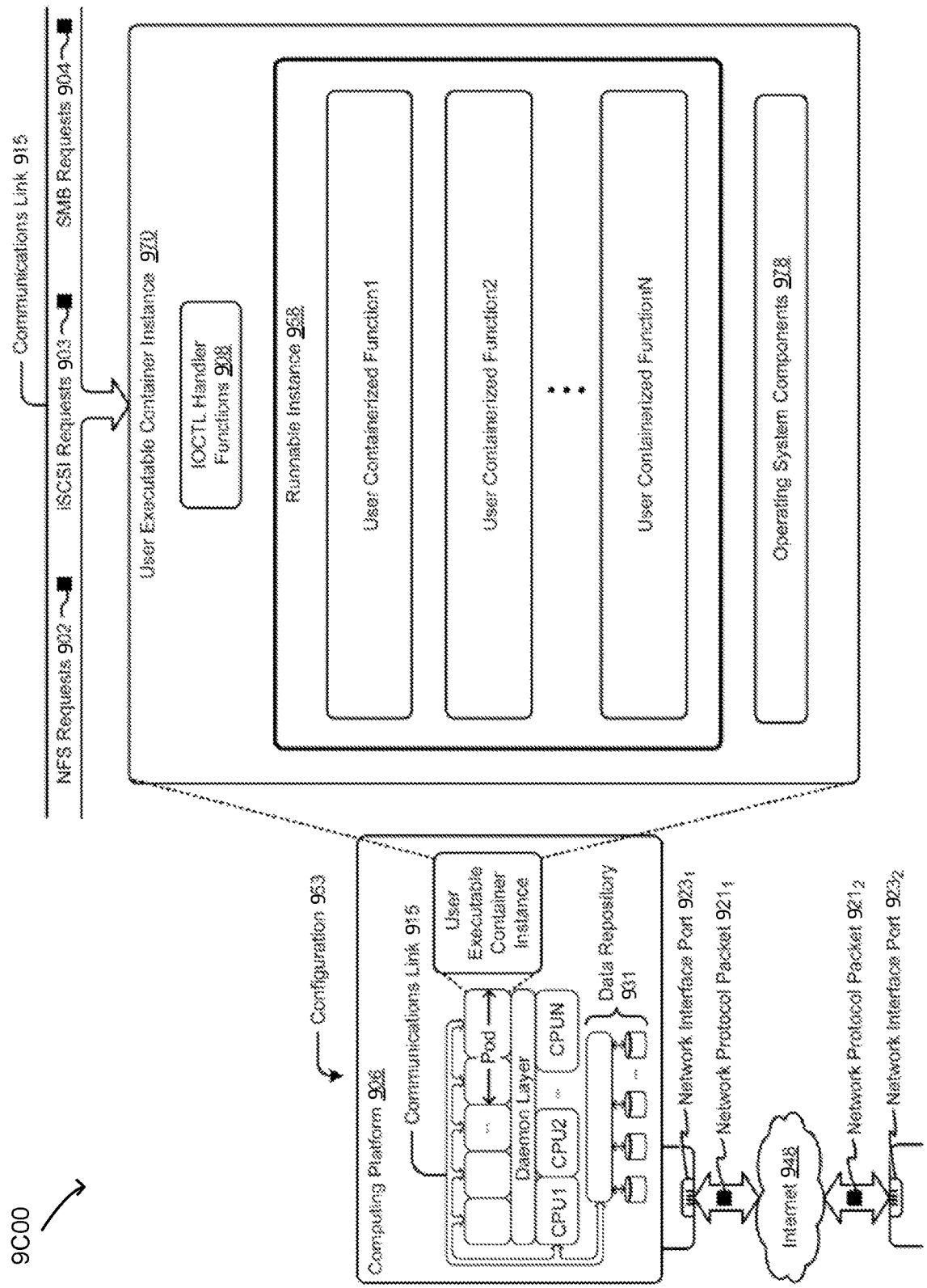

FIG. 9C is a block diagram illustrating virtualization system architecture 9C00 configured to implement one or more aspects of the present embodiments. As shown in FIG. 9C, virtualization system architecture 9C00 includes a collection of interconnected components, including a user executable container instance in configuration 953 that is further described as pertaining to user executable container instance 970. Configuration 953 includes a daemon layer (as shown) that performs certain functions of an operating system.

User executable container instance 990 comprises any number of user containerized functions (e.g., user containerized function1, user containerized function2, . . . , user containerized functionN). Such user containerized functions can execute autonomously or can be interfaced with or wrapped in a runnable object to generate a runnable instance (e.g., runnable instance 958). In some cases, the shown operating system components 978 comprise portions of an operating system, which portions are interfaced with or included in the runnable instance and/or any user containerized functions. In some embodiments of a daemon-assisted containerized architecture, computing platform 906 might or might not host operating system components other than operating system components 978. More specifically, the shown daemon might or might not host operating system components other than operating system components 978 of user executable container instance 970.

In some embodiments, the virtualization system architecture 9A00, 9B00, and/or 9C00 can be used in any combination to implement a distributed platform that contains multiple servers and/or nodes that manage multiple tiers of storage where the tiers of storage might be formed using the shown data repository 931 and/or any forms of network accessible storage. As such, the multiple tiers of storage may include storage that is accessible over communications link 915. Such network accessible storage may include cloud storage or networked storage (e.g., a SAN or storage area network). Unlike prior approaches, the disclosed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices such as SSDs or RAPMs, or hybrid HDDs, or other types of high-performance storage devices.

In some embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

In some embodiments, any one or more of the aforementioned virtual disks can be structured from any one or more of the storage devices in the storage pool. In some emboidment, a virtual disk is a storage abstraction that is exposed by a controller virtual machine or container to be used by another virtual machine or container. In some embodiments, the virtual disk is exposed by operation of a storage protocol such as iSCSI or NFS or SMB. In some embodiments, a virtual disk is mountable. In some embodiments, a virtual disk is mounted as a virtual storage device.

In some embodiments, some or all of the servers or nodes run virtualization software. Such virtualization software might include a hypervisor (e.g., as shown in configuration 951) to manage the interactions between the underlying hardware and user virtual machines or containers that run client software.

Distinct from user virtual machines or user executable containers, a special controller virtual machine (e.g., as depicted by controller virtual machine instance 930) or as a special controller executable container is used to manage certain storage and I/O activities. Such a special controller virtual machine is sometimes referred to as a controller executable container, a service virtual machine (SVM), a service executable container, or a storage controller. In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines—above the hypervisors—thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

Figure 9D:
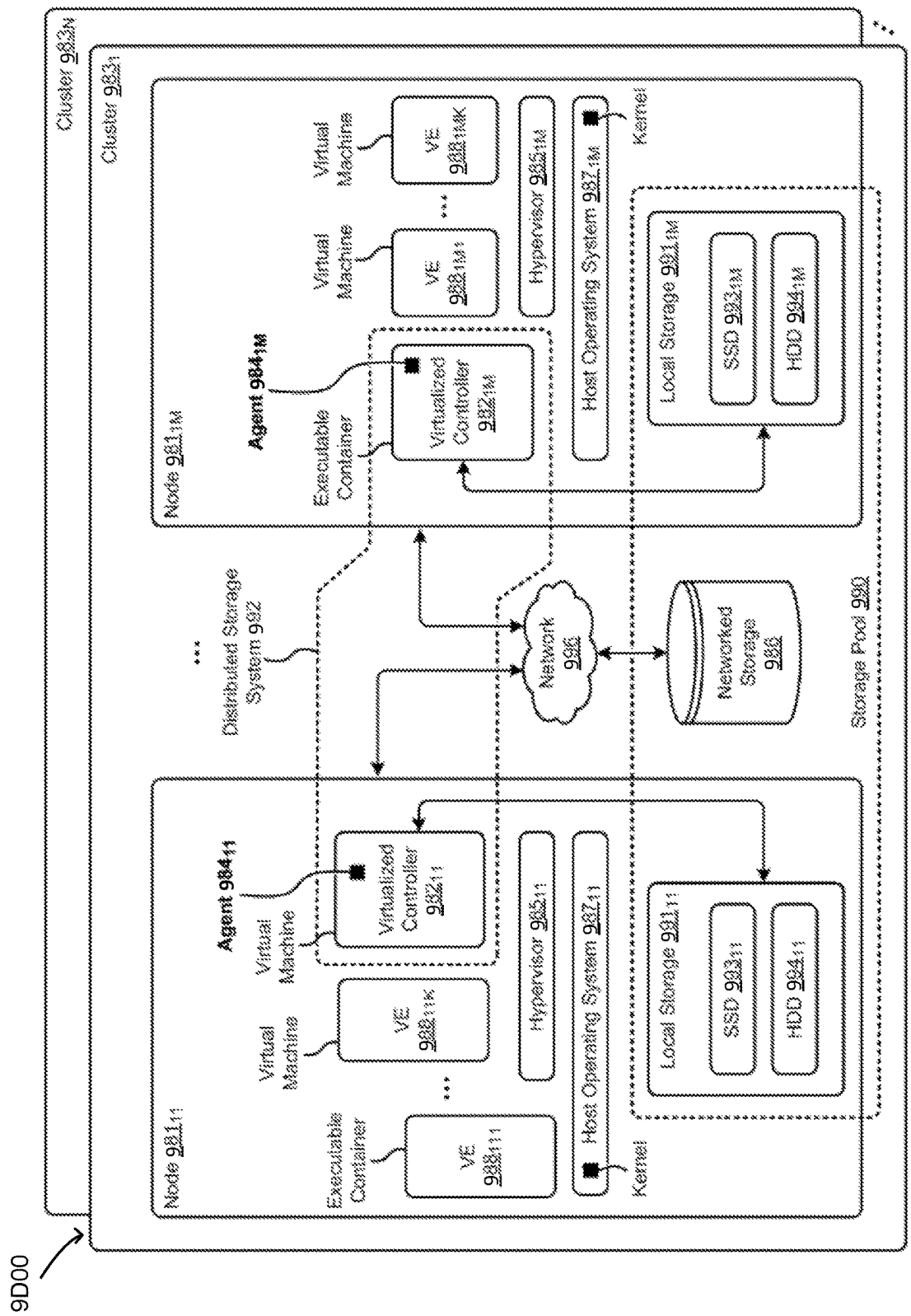

FIG. 9D is a block diagram illustrating virtualization system architecture 9D00 configured to implement one or more aspects of the present embodiments. As shown in FIG. 9D, virtualization system architecture 9D00 includes a distributed virtualization system that includes multiple clusters (e.g., cluster $983_1$, . . . , cluster $983_N$) comprising multiple nodes that have multiple tiers of storage in a storage pool. Representative nodes (e.g., node $981_{11}$, . . . , node $981_{1M}$) and storage pool 990 associated with cluster $983_1$ are shown. Each node can be associated with one server, multiple servers, or portions of a server. The nodes can be associated (e.g., logically and/or physically) with the clusters. As shown, the multiple tiers of storage include storage that is accessible through a network 996, such as a networked storage 986 (e.g., a storage area network or SAN, network attached storage or NAS, and/or the like). The multiple tiers of storage further include instances of local storage (e.g., local storage $991_{11}$, . . . , local storage $991_{1M}$). For example, the local storage can be within or directly attached to a server and/or appliance associated with the nodes. Such local storage can include solid state drives (SSD $993_{11}$, . . . , SSD $993_{1M}$), hard disk drives (HDD $994_{11}$, HDD $994_{1M}$), and/or other storage devices.

As shown, any of the nodes of the distributed virtualization system can implement one or more user virtualized entities (e.g., VE $988_{111}$, . . . , VE $988_{11K}$, . . . , VE $988_{1M1}$, . . . , VE $988_{1MK}$) such as virtual machines (VMs) and/or executable containers. The VMs can be characterized as software-based computing "machines" implemented in a container-based or hypervisor-assisted virtualization environment that emulates the underlying hardware resources (e.g., CPU, memory, and/or the like) of the nodes. For example, multiple VMs can operate on one physical machine (e.g., node host computer) running a single host operating system (e.g., host operating system $987_{11}$, . . . , host operating system $987_{1M}$), while the VMs run multiple applications on various respective guest operating systems. Such flexibility can be facilitated at least in part by a hypervisor (e.g., hypervisor $985_{11}$, . . . , hypervisor $985_{1M}$), which hypervisor is logically located between the various guest operating systems of the VMs and the host operating system of the physical infrastructure (e.g., node).

As an alternative, executable containers may be implemented at the nodes in an operating system-based virtualization environment or in a containerized virtualization environment. The executable containers are implemented at the nodes in an operating system virtualization environment or container virtualization environment. The executable containers can include groups of processes and/or resources (e.g., memory, CPU, disk, and/or the like) that are isolated from the node host computer and other containers. Such executable containers directly interface with the kernel of the host operating system (e.g., host operating system $987_{11}$, . . . , host operating system $987_{1M}$) without, in most cases, a hypervisor layer. This lightweight implementation can facilitate efficient distribution of certain software components, such as applications or services (e.g., micro-services). Any node of a distributed virtualization system can implement both a hypervisor-assisted virtualization environment and a container virtualization environment for various purposes. Also, any node of a distributed virtualization system can implement any one or more types of the foregoing virtualized controllers so as to facilitate access to storage pool 990 by the VMs and/or the executable containers.

Multiple instances of such virtualized controllers can coordinate within a cluster to form the distributed storage system 992 which can, among other operations, manage the storage pool 990. This architecture further facilitates efficient scaling in multiple dimensions (e.g., in a dimension of computing power, in a dimension of storage space, in a dimension of network bandwidth, and/or the like).

In some embodiments, a particularly-configured instance of a virtual machine at a given node can be used as a virtualized controller in a hypervisor-assisted virtualization environment to manage storage and I/O (input/output or IO) activities of any number or form of virtualized entities. For example, the virtualized entities at node $981_{11}$ can interface with a controller virtual machine (e.g., virtualized controller $982_{11}$) through hypervisor $985_{11}$ to access data of storage pool 990. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 992. For example, a hypervisor at one node in the distributed storage system 992 might correspond to software from a first vendor, and a hypervisor at another node in the distributed storage system 992 might correspond to a second software vendor. As another virtualized controller implementation example, executable containers can be used to implement a virtualized controller (e.g., virtualized controller $982_{1M}$) in an operating system virtualization environment at a given node. In this case, for example, the virtualized entities at node $981_{1M}$ can access the storage pool 990 by interfacing with a controller container (e.g., virtualized controller $982_{1M}$) through hypervisor $985_{1M}$ and/or the kernel of host operating system $987_{1M}$.

In some embodiments, one or more instances of an agent can be implemented in the distributed storage system 992 to facilitate the herein disclosed techniques. Specifically, agent $984_{11}$ can be implemented in the virtualized controller $982_{11}$, and agent $984_{1M}$ can be implemented in the virtualized controller $982_{1M}$. Such instances of the virtualized controller can be implemented in any node in any cluster. Actions taken by one or more instances of the virtualized controller can apply to a node (or between nodes), and/or to a cluster (or between clusters), and/or between any resources or subsystems accessible by the virtualized controller or their agents.

Exemplary Computer System

Figure 10:
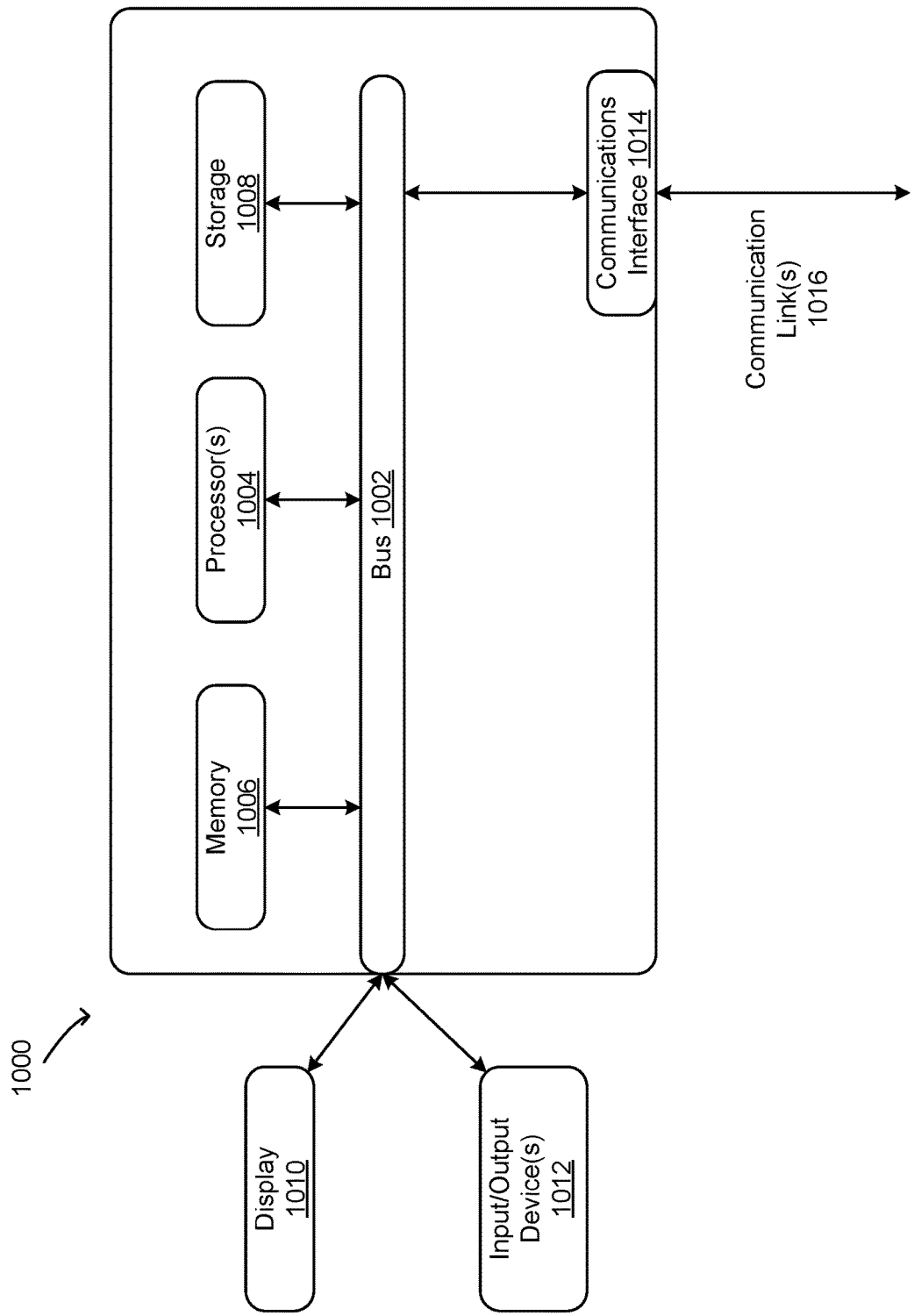
FIG. 10 is a block diagram illustrating a computer system configured to implement one or more aspects of the present embodiments.

FIG. 10 is a block diagram illustrating a computer system 1000 configured to implement one or more aspects of the present embodiments. In some embodiments, computer system 1000 may be representative of a computer system for implementing one or more aspects of the embodiments disclosed in FIGS. 1-9D. In some embodiments, computer system 1000 is a server machine operating in a data center or a cloud computing environment. suitable for implementing an embodiment of the present invention. As shown, computer system 1000 includes a bus 1002 or other communication mechanism for communicating information, which interconnects subsystems and devices, such as one or more processors 1004, memory 1006, storage 1008, optional display 1010, one or more input/output devices 1012, and a communications interface 1014. Computer system 1000 described herein is illustrative and any other technically feasible configurations fall within the scope of the present disclosure.

The one or more processors 1004 include any suitable processors implemented as a central processing unit (CPU), a graphics processing unit (GPU), an application-specific integrated circuit (ASIC), a field programmable gate array (FPGA), an artificial intelligence (AI) accelerator, any other type of processor, or a combination of different processors, such as a CPU configured to operate in conjunction with a GPU. In general, the one or more processors 1004 may be any technically feasible hardware unit capable of processing data and/or executing software applications. Further, in the context of this disclosure, the computing elements shown in computer system 1000 may correspond to a physical computing system (e.g., a system in a data center) or may be a virtual computing instance, such as any of the virtual machines described in FIGS. 9A-9D.

Memory 1006 includes a random access memory (RAM) module, a flash memory unit, and/or any other type of memory unit or combination thereof. The one or more processors 1004, and/or communications interface 1014 are configured to read data from and write data to memory 1006. Memory 1006 includes various software programs that include one or more instructions that can be executed by the one or more processors 1004 and application data associated with said software programs.

Storage 1008 includes non-volatile storage for applications and data, and may include one or more fixed or removable disk drives, HDDs, SSD, NVMes, vDisks, flash memory devices, and/or other magnetic, optical, and/or solid state storage devices.

Communications interface 1014 includes hardware and/or software for coupling computer system 1000 to one or more communication links 1015. The one or more communication links 1015 may include any technically feasible type of communications network that allows data to be exchanged between computer system 1000 and external entities or devices, such as a web server or another networked computing system. For example, the one or more communication links 1015 may include one or more wide area networks (WANs), one or more local area networks (LANs), one or more wireless (WiFi) networks, the Internet, and/or the like.

In sum, an allocator executing on a computer system maintains an allocator data structure consisting of a sparse hierarchical data structure that identifies an allocator page identifying a region of a backing store having various numbers of free blocks. The allocator receives a request to allocate one or more blocks in a backing store. The allocator then accesses a sparse hierarchical data structure to identify an allocator page identifying a region of the backing store having a greatest number of free blocks. The allocator allocates the one or more blocks corresponding to the request. The allocator updates the sparse hierarchical data structure based on the allocation of the one or more blocks corresponding to the request.

At least one technical advantage of the disclosed techniques relative to the prior art is that the disclosed techniques enable an allocator to identify an allocator page associated with the largest number of free blocks with greater efficiency and speed relative to prior techniques. Another advantage of the disclosed techniques is that, because the allocator only initiates leaf nodes and parent nodes if and when needed, the allocator initializes, searches, and updates the allocator data structure with improved speed and storage efficiency relative to conventional approaches. These technical advantages provide one or more technological advancements over prior art approaches.

1. In some embodiments, one or more non-transitory computer-readable media store program instructions that, when executed by one or more processors, cause the one or more processors to perform steps of: receiving a request to allocate one or more blocks in a block store; accessing a sparse hierarchical data structure to identify an allocator page identifying a region of a backing store having a greatest number of free blocks; and allocating the one or more blocks.

2. The one or more non-transitory computer-readable media of clause 1, wherein the sparse hierarchical data structure comprises a tree of heap data structures.

3. The one or more non-transitory computer-readable media of clause 1 or clause 2, wherein the sparse hierarchical data structure comprises a leaf node identifying a plurality of allocator pages and a number of free blocks in each allocator page.

4. The one or more non-transitory computer-readable media of any of clauses 1-3, wherein the sparse hierarchical data structure comprises a parent node identifying a plurality of leaf nodes and a number of free blocks in an allocator page identified by each leaf node having a greatest number of free blocks among a plurality of allocator pages identified by the leaf node.

5. The one or more non-transitory computer-readable media of any of clauses 1-4, wherein the sparse hierarchical data structure comprises a level two parent node identifying a plurality of level one parent nodes and a number of free blocks in an allocator page identified via each of the level one parent nodes having a greatest number of free blocks among a plurality of allocator pages identified via the level one parent nodes.

6. The one or more non-transitory computer-readable media of any of clauses 1-5, wherein the steps further comprise allocating a new leaf node to the sparse hierarchical data structure in response to determining that there is insufficient free space managed by the sparse hierarchical data structure to satisfy the request.

7. The one or more non-transitory computer-readable media of any of clauses 1-6, wherein the request is received by a component allocating blocks for different regions of the backing store than other components allocating blocks from the backing store.

8. The one or more non-transitory computer-readable media of any of clauses 1-7, wherein allocating the one or more blocks comprises performing at least one of a sift-up operation or a sift-down operation on a set of entries included in the hierarchical data structure.

9. The one or more non-transitory computer-readable media of any of clauses 1-8, wherein allocating the one or more blocks comprises: updating a leaf node included in the hierarchical data structure based on a quantity of the one or more blocks; and updating a parent node included in the hierarchical data structure to configure the parent node to manage the leaf node.

10. The one or more non-transitory computer-readable media of any of clauses 1-9, wherein allocating the one or more blocks comprises generating a parent node included in the hierarchical data structure configured to manage a leaf node included in the hierarchical data structure and associated with the allocator page.

11. In some embodiments, a method for managing free space in a block store comprises: receiving a request to allocate one or more blocks in a block store; accessing a sparse hierarchical data structure to identify an allocator page identifying a region of a backing store having a greatest number of free blocks; and allocating the one or more blocks.

12. The method of clause 11, wherein the sparse hierarchical data structure comprises a tree of heap data structures.

13. The method of clause 11 or clause 12, wherein the sparse hierarchical data structure comprises a leaf node identifying a plurality of allocator pages and a number of free blocks in each allocator page.

14. The method of any of clauses 11-13, wherein the sparse hierarchical data structure comprises a parent node identifying a plurality of leaf nodes and a number of free blocks in an allocator page identified by each leaf node having a greatest number of free blocks among a plurality of allocator pages identified by the leaf node.

15. The method of any of clauses 11-14, wherein the sparse hierarchical data structure comprises a level two parent node identifying a plurality of level one parent nodes and a number of free blocks in an allocator page identified via each of the level one parent nodes having a greatest number of free blocks among a plurality of allocator pages identified via the level one parent nodes.

16. The method of any of clauses 11-15, further comprising allocating a new leaf node to the sparse hierarchical data structure in response to determining that there is insufficient free space managed by the sparse hierarchical data structure to satisfy the request.

17. The method of any of clauses 11-16, wherein the request is received by a component allocating blocks for different regions of the backing store than other components allocating blocks from the backing store.

18. The method of any of clauses 11-17, wherein allocating the one or more blocks comprises performing at least one of a sift-up operation or a sift-down operation on a set of entries included in the hierarchical data structure.

19. The method of any of clauses 11-18, wherein allocating the one or more blocks comprises: updating a leaf node included in the hierarchical data structure based on a quantity of the one or more blocks; and updating a parent node included in the hierarchical data structure to configure the parent node to manage the leaf node.

20. The method of any of clauses 11-19, wherein allocating the one or more blocks comprises generating a parent node included in the hierarchical data structure configured to manage a leaf node included in the hierarchical data structure and associated with the allocator page.

21. In some embodiments, a system comprises: a memory storing instructions; and one or more processors that is coupled to the memory and, when executing the instructions is configured to: receive a request to allocate one or more blocks in a block store; access a sparse hierarchical data structure to identify an allocator page identifying a region of a backing store having a greatest number of free blocks; and allocate the one or more blocks.

22. The system of clause 21, wherein the sparse hierarchical data structure comprises a tree of heap data structures.

23. The system of clause 21 or clause 22, wherein the sparse hierarchical data structure comprises a leaf node identifying a plurality of allocator pages and a number of free blocks in each allocator page.

24. The system of any of clauses 21-23, wherein the sparse hierarchical data structure comprises a parent node identifying a plurality of leaf nodes and a number of free blocks in an allocator page identified by each leaf node having a greatest number of free blocks among a plurality of allocator pages identified by the leaf node.

25. The system of any of clauses 21-24, wherein the sparse hierarchical data structure comprises a level two parent node identifying a plurality of level one parent nodes and a number of free blocks in an allocator page identified via each of the level one parent nodes having a greatest number of free blocks among a plurality of allocator pages identified via the level one parent nodes.

26. The system of any of clauses 21-25, wherein the one or more processors when executing the instructions are further configured to allocate a new leaf node to the sparse hierarchical data structure in response to determining that there is insufficient free space managed by the sparse hierarchical data structure to satisfy the request.

27. The system of any of clauses 21-26, wherein the request is received by a component allocating blocks for different regions of the backing store than other components allocating blocks from the backing store.

28. The system of any of clauses 21-27, wherein to allocate the one or more blocks, the one or more processors are configured to perform at least one of a sift-up operation or a sift-down operation on a set of entries included in the hierarchical data structure.

29. The system of any of clauses 21-28, wherein, to allocate the one or more blocks, the one or more processors are configured to: update a leaf node included in the hierarchical data structure based on a quantity of the one or more blocks; and update a parent node included in the hierarchical data structure to configure the parent node to manage the leaf node.

30. The system of any of clauses 21-29, wherein, to allocate the one or more blocks, the one or more processors are configured to generate a parent node included in the hierarchical data structure configured to manage a leaf node included in the hierarchical data structure and associated with the allocator page.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, and/or the like) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RANI), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. One or more non-transitory computer-readable media storing program instructions that, when executed by one or more processors, cause the one or more processors to perform steps of:
   receiving a request to allocate one or more blocks in a block store;
   accessing a sparse hierarchical data structure to identify an allocator page identifying a region of a backing store having a greatest number of free blocks; and
   allocating the one or more blocks;
   wherein the sparse hierarchical data structure comprises a tree of heap data structures.

2. The one or more non-transitory computer-readable media of claim 1, wherein the sparse hierarchical data structure comprises a leaf node identifying a plurality of allocator pages and a number of free blocks in each allocator page.

3. The one or more non-transitory computer-readable media of claim 1, wherein the sparse hierarchical data structure comprises a parent node identifying a plurality of leaf nodes and a number of free blocks in an allocator page identified by each leaf node having a greatest number of free blocks among a plurality of allocator pages identified by the leaf node.

4. The one or more non-transitory computer-readable media of claim 1, wherein the sparse hierarchical data structure comprises a level two parent node identifying a plurality of level one parent nodes and a number of free blocks in an allocator page identified via each of the level one parent nodes having a greatest number of free blocks among a plurality of allocator pages identified via the level one parent nodes.

5. The one or more non-transitory computer-readable media of claim 1, wherein the steps further comprise allocating a new leaf node to the sparse hierarchical data structure in response to determining that there is insufficient free space managed by the sparse hierarchical data structure to satisfy the request.

6. The one or more non-transitory computer-readable media of claim 1, wherein the request is received by a component of a plurality of components, each component allocating blocks for different regions from a separate region of the backing store than other components allocating blocks from the backing store.

7. The one or more non-transitory computer-readable media of claim 1, wherein allocating the one or more blocks comprises performing at least one of a sift-up operation or a sift-down operation on a set of entries included in the hierarchical data structure.

8. The one or more non-transitory computer-readable media of claim 1, wherein allocating the one or more blocks comprises:
   updating a leaf node included in the hierarchical data structure based on a quantity of the one or more blocks; and
   updating a parent node included in the hierarchical data structure to configure the parent node to manage the leaf node.

9. The one or more non-transitory computer-readable media of claim 1, wherein allocating the one or more blocks comprises generating a parent node included in the hierarchical data structure configured to manage a leaf node included in the hierarchical data structure and associated with the allocator page.

10. A method for managing free space in a block store, the method comprising:
    receiving a request to allocate one or more blocks in a block store;
    accessing a sparse hierarchical data structure to identify an allocator page identifying a region of a backing store having a greatest number of free blocks; and
    allocating the one or more blocks;
    wherein the sparse hierarchical data structure comprises a tree of heap data structures.

11. The method of claim 10, wherein the sparse hierarchical data structure comprises a leaf node identifying a plurality of allocator pages and a number of free blocks in each allocator page.

12. The method of claim 10, wherein the sparse hierarchical data structure comprises a parent node identifying a plurality of leaf nodes and a number of free blocks in an allocator page identified by each leaf node having a greatest number of free blocks among a plurality of allocator pages identified by the leaf node.

13. The method of claim 10, wherein the sparse hierarchical data structure comprises a level two parent node identifying a plurality of level one parent nodes and a number of free blocks in an allocator page identified via each of the level one parent nodes having a greatest number of free blocks among a plurality of allocator pages identified via the level one parent nodes.

14. The method of claim 10, further comprising allocating a new leaf node to the sparse hierarchical data structure in response to determining that there is insufficient free space managed by the sparse hierarchical data structure to satisfy the request.

15. The method of claim 10, wherein the request is received by a component of a plurality of components, each component allocating blocks for different regions from a separate region of the backing store than other components allocating blocks from the backing store.

16. The method of claim 10, wherein allocating the one or more blocks comprises performing at least one of a sift-up operation or a sift-down operation on a set of entries included in the hierarchical data structure.

17. The method of claim 10, wherein allocating the one or more blocks comprises:
    updating a leaf node included in the hierarchical data structure based on a quantity of the one or more blocks; and
    updating a parent node included in the hierarchical data structure to configure the parent node to manage the leaf node.

18. The method of claim 10, wherein allocating the one or more blocks comprises generating a parent node included in the hierarchical data structure configured to manage a leaf node included in the hierarchical data structure and associated with the allocator page.

19. A system, comprising:
    a memory storing instructions; and
    one or more processors that is coupled to the memory and, when executing the instructions is configured to:
      receive a request to allocate one or more blocks in a block store;
      access a sparse hierarchical data structure to identify an allocator page identifying a region of a backing store having a greatest number of free blocks; and
      allocate the one or more blocks;
      wherein the sparse hierarchical data structure comprises a tree of heap data structures.

20. The system of claim 19, wherein the sparse hierarchical data structure comprises a leaf node identifying a plurality of allocator pages and a number of free blocks in each allocator page.

21. The system of claim 19, wherein the sparse hierarchical data structure comprises a parent node identifying a plurality of leaf nodes and a number of free blocks in an allocator page identified by each leaf node having a greatest number of free blocks among a plurality of allocator pages identified by the leaf node.

22. The system of claim 19, wherein the sparse hierarchical data structure comprises a level two parent node identifying a plurality of level one parent nodes and a number of free blocks in an allocator page identified via each of the level one parent nodes having a greatest number of free blocks among a plurality of allocator pages identified via the level one parent nodes.

23. The system of claim 19, wherein the one or more processors when executing the instructions are further configured to allocate a new leaf node to the sparse hierarchical data structure in response to determining that there is insufficient free space managed by the sparse hierarchical data structure to satisfy the request.

24. The system of claim 19, wherein the request is received by a component of a plurality of components, each component allocating blocks for different regions from a separate region of the backing store than other components allocating blocks from the backing store.

25. The system of claim 19, wherein to allocate the one or more blocks, the one or more processors are configured to perform at least one of a sift-up operation or a sift-down operation on a set of entries included in the hierarchical data structure.

26. The system of claim 19, wherein, to allocate the one or more blocks, the one or more processors are configured to:
   update a leaf node included in the hierarchical data structure based on a quantity of the one or more blocks; and
   update a parent node included in the hierarchical data structure to configure the parent node to manage the leaf node.

27. The system of claim 19, wherein to allocate the one or more blocks, the one or more processors are configured to generate a parent node included in the hierarchical data structure configured to manage a leaf node included in the hierarchical data structure and associated with the allocator page.

\* \* \* \* \*